US006312788B1

(12) United States Patent
Mohri et al.

(10) Patent No.: US 6,312,788 B1
(45) Date of Patent: *Nov. 6, 2001

(54) IMAGE RECEIVING SHEET AND IMAGE RECEIVING APPARATUS USING THE SAME

(75) Inventors: Shuhei Mohri; Tahei Ishiwatari; Masanao Kunugi, all of Nagano (JP)

(73) Assignee: Seiko Epson Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/861,655

(22) Filed: May 22, 1997

(30) Foreign Application Priority Data

| | | |
|---|---|---|
| May 22, 1996 | (JP) | 8-127558 |
| Feb. 28, 1997 | (JP) | 9-046479 |
| Feb. 28, 1997 | (JP) | 9-046480 |
| Feb. 28, 1997 | (JP) | 9-046481 |
| Feb. 28, 1997 | (JP) | 9-046482 |

(51) Int. Cl.[7] .... B32B 3/00

(52) U.S. Cl. .... 428/195

(58) Field of Search .... 399/411; 428/195, 428/199, 211, 212, 220, 332, 333, 339, 204, 206, 207, 323, 327, 411.1; 430/32, 47, 126

(56) References Cited

U.S. PATENT DOCUMENTS

| | | | |
|---|---|---|---|
| 3,615,418 * | 10/1971 | Staudenmayer et al. | 96/1.6 |
| 3,790,382 | 2/1974 | Dahlman . | |
| 3,944,710 | 3/1976 | Parent | 428/412 |

(List continued on next page.)

FOREIGN PATENT DOCUMENTS

| | | | |
|---|---|---|---|
| 0 349 227 | 1/1990 | (EP) . | |
| 0 390 928 | 10/1990 | (EP) . | |
| 0 442 567 | 8/1991 | (EP) . | |
| 0 509 808 | 10/1992 | (EP) . | |
| 0 523 511 | 1/1993 | (EP) . | |
| 0 603 569 | 6/1994 | (EP) . | |
| A1 0 603 569 | 6/1994 | (EP) | B41M/5/00 |
| 0 707 244 | 4/1996 | (EP) . | |
| 56-95245 | 8/1981 | (JP) . | |
| 1-279277 | 11/1989 | (JP) . | |
| 2-263642 | 10/1990 | (JP) | B32B/27/00 |

(List continued on next page.)

OTHER PUBLICATIONS

Patent Abstracts of Japan, vol. 095, No. 010, Nov. 30, 1995 for JP 07 181625 A (Mistubishi Paper Mills Ltd), Jul. 21, 1995.

(List continued on next page.)

*Primary Examiner*—Bruce H. Hess
*Assistant Examiner*—Michael E. Grendzynski
(74) *Attorney, Agent, or Firm*—Sughrue, Mion, Zinn, Macpeak & Seas, PLLC

(57) ABSTRACT

An image is formed in a receiving sheet by embedding toner in an image receiving layer on a base. The distribution of molecular weight of resin in the image receiving layer measured by gel permeation chromatography (GPC) of soluble matters of tetrahydrofuran (THF) has at least two peaks or shoulders. And the critical surface tension of the image receiving layer is made to be smaller than the critical surface tension of external additive. Further, the image receiving layer has a thermal characteristic such that a storage modulus (G') of $1\times10^2$ Pa to $1\times10^5$ Pa and a loss modulus (G") of $1\times10^2$ Pa to $1\times10^5$ Pa at temperatures at which the toner is fixed. Furthermore, the image receiving layer contains an aromatic ester compound, more preferably the aromatic polyester compound being dialkyl phthalate. Still further, the image receiving layer has a Rockwell hardness (R scale) HRa of 121 or lower.

24 Claims, 5 Drawing Sheets

U.S. PATENT DOCUMENTS

| | | | | |
|---|---|---|---|---|
| 4,337,303 | | 6/1982 | Sahyun et al. | 430/11 |
| 4,529,650 | | 7/1985 | Martinez | 428/336 |
| 4,549,803 | | 10/1985 | Ohno et al. | 355/14 FU |
| 5,045,424 | * | 9/1991 | Rimai et al. | 430/126 |
| 5,055,371 | | 10/1991 | Lee et al. . | |
| 5,087,536 | * | 2/1992 | Aslam et al. | 430/13 |
| 5,200,253 | | 4/1993 | Yamaguchi et al. . | |
| 5,234,784 | | 8/1993 | Mulhammed et al. . | |
| 5,255,060 | | 10/1993 | Chikano . | |
| 5,281,261 | | 1/1994 | Lin . | |
| 5,305,061 | | 4/1994 | Takama et al. . | |
| 5,350,730 | | 9/1994 | Hirota et al. . | |
| 5,378,576 | | 1/1995 | Sakai et al. | 430/126 |
| 5,458,954 | | 10/1995 | Ogi et al. . | |
| 5,504,559 | * | 4/1996 | Ojima et al. | 355/211 |
| 5,663,026 | | 9/1997 | Kasuya et al. . | |
| 5,666,628 | | 9/1997 | Fukai . | |
| 5,693,437 | | 12/1997 | Malhotra . | |
| 5,747,145 | * | 5/1998 | Sorriero et al. | 428/195 |
| 5,774,775 | | 6/1998 | Aoto et al. . | |
| 5,822,671 | * | 10/1998 | Takama | 399/342 |

FOREIGN PATENT DOCUMENTS

| | | | |
|---|---|---|---|
| 4-125567 | 4/1992 | (JP) | G03G/7/00 |
| 4-212168 | 8/1992 | (JP) | G03G/7/00 |
| 7-181625 | 7/1995 | (JP) . | |
| 8-194394 | 7/1996 | (JP) | G03G/15/16 |
| W0 91 13385 | 9/1991 | (WO) . | |
| W0 97 12283 | 4/1997 | (WO) . | |
| W0 97 22038 | 6/1997 | (WO) . | |

OTHER PUBLICATIONS

Patent Abstracts of Japan, vol. 017, No. 600 (P–1637), Nov. 4, 1993 for JP 05 181305 A (Konica Corp), Jul. 23, 1993.

Patent Abstracts of Japan, vol. 018, No. 154 (M–1577), Mar. 15, 1994 for JP 05 330240 A (Dainippon Printing Co. Ltd; Others: 01), Dec. 14, 1993.

Database WPI, Section Ch, Week 9424, Derwent Publications Ltd., London, GB: Class A89, AN 94–196745 XP002093341 for JP 06 135123A (Tomoegawa Seishisho KK), May 17, 1994.

Database WPI, Section Ch, Week 9115, Derwent Publications Ltd., London, GB, Class A89, AN 91–106349 XP002093342 for JP 03 048859 A (Canon KK), Mar. 1, 1991.

Patent Abstracts of Japan, vol. 016, No. 386 (P–1404), Aug. 18, 1992 for JP 04 125567 A (Toshiba Corp), Apr. 27, 1992.

* cited by examiner

IMAGE RECEIVING SHEET AND IMAGE RECEIVING APPARATUS USING THE SAME

BACKGROUND OF THE INVENTION

1. Field of the Invention

The present invention relates to an image forming apparatus such as a copying machine, a printer, a facsimile apparatus and the like, and to an image receiving sheet to be applied to the foregoing apparatus. More particularly, the present invention relates to an image forming apparatus capable of outputting a multi-color image and an image receiving sheet to be applied to the foregoing apparatus.

2. Description of the Prior Art

In recent years, a high quality color image has been required to perform a presentation or the like. Also research and development of the electrophotography has a requirement for improving the quality of the image including the color reproducibility and image density. In order to improve the saturation, image density and luster of the color image, an image receiving sheet, such as glossy paper, can be available as exclusive paper. The image receiving sheet is structured to embed toner into a resin layer on the sheet in order to prevent deformation and shift of dots when toner is fixed with heat and attain luster of the surface of the image. Since the image receiving sheet is required to have luster, light resistance and water resistance equivalent to the silver salt photography, toner must be deeply embedded into the resin layer by fixing and smoothness of the surface of the image must be realized. An image receiving sheet of a type to embed the toner uses a transparent sheet as the base thereof so as to be applied as a sheet for an over head projector (OHP). If the image receiving sheet is used as the OHP sheet, the difference in the smoothness of the surface determines the color development characteristic of the projected image. Accordingly, the image receiving sheet for electrophotography must have smoothness on the surface of the fixed image and therefore embedding of the toner into the resin layer is a critical factor.

To satisfy the above-mentioned requirements, Japanese Patent Publication No. Hei. 4-125567 has a structure in which an image receiving layer is formed which contains thermoplastic resin having a softening point lower than that of the color toner and a print in which the toner has been embedded in the image receiving layer and thus irregularity is prevented is obtained so as to solve the above-mentioned problem.

If a resin layer having a low softening point as disclosed in Japanese Patent Publication No. Hei. 4-125567 is applied to the surface of the image receiving sheet, the weak coagulation force of the melted resin results in that offset of the toner layer and the image receiving layer to the fixing roller easily takes place. When the image is stored, there arises a problem of fusion of the image receiving sheet due to blocking or the like.

By the way, the foregoing suggestion for forming the image receiving layer on the surface of the base sheet has been performed to be adaptable to an image receiving sheet for forming a monochrome image and an image forming apparatus arranged to use the foregoing image receiving sheet. An object of the foregoing suggestion is to improve the fixing characteristic in order to realize strength sufficient to prevent separation of toner from the image receiving sheet and to improve the conveyance easiness to prevent jamming of the image receiving sheet.

However, the image forming apparatus for outputting a color image and the image receiving sheet to be adapted to the foregoing apparatus must form toner images fixed on the image receiving sheet and having excellent color development characteristic and transparency in order to obtain a high quality color image in a manner different from the image forming apparatus for outputting a monochrome image.

To obtain an image having excellent color development characteristic and transparency, it is an important fact that the fixed toner image does not scatter light.

To prevent light scattering caused by the fixed image, the surface of the fixed image must satisfactorily be smoothed and the fixed image must be free from generation of an interface between toner particles. To realize his, a method has generally been employed in which the toner is sufficiently melted when the image is fixed. In U.S. Pat. No. 4,549,803, a structure has been disclosed which employs the foregoing method and in which the fixing speed and the fixing temperature can be varied to be adaptable to the type of the image receiving sheet, for example, whether the sheet is plain paper or a transparent sheet for OHP (Over Head Projector). However, the foregoing structure suffers from a problem in that the structure of the image forming apparatus becomes too complicated to switch the fixing speed and the fixing temperature.

As another method of sufficiently melting toner when fixing is performed, a method has been suggested which uses so-called sharp melt toner having a low melting point, or having the melting viscosity which is rapidly lowered when the heated toner reaches the melting toner. However, simple use of the sharp melt toner is insufficient to form an excellent image. The reason for this is that a color image is formed by generally using toners in three colors, that is, cyan, yellow and magenta. Moreover, black toner is frequently used to remove the undercolor and to form a high contrast black characters. Therefore, the toner is, in the form of a multiplicity of layers, allowed to adhere to the surface of the image receiving sheet. Thus, the thickness of the toner image is enlarged as compared with a monochrome image. Therefore, by lowering the melting viscosity of the toner when fixing is performed is insufficient to attain the effect of smoothing the surface of the fixed image. In this case, the surface becomes irregular excessively and thus considerable irregular reflection takes place on the surface. Thus, the transparency is lowered and there arises a problem in that only a dark image can be formed. Since the thickness of the toner image is large, heat conductivity from the fixing means becomes insufficient or non-uniform when fixing is performed. As a result, toner cannot sufficiently be melted and thus a satisfactory effect of removing the interface between toner particles cannot be obtained. Therefore, color reproducibility deteriorates and there arises a problem in that a sharp color image cannot be formed. In general, the fixing means is a fixing means, for example, a known heat roller fixing means which is structured to heat and press a toner image to the image receiving sheet when fixing is performed. However, there arises a problem in that a so-called offset phenomenon takes place in which a portion of the toner is allowed to adhere to the fixing means in place of adhesion to the image receiving sheet. Moreover, in a case where the sharp melt toner is fixed to a recording medium (so-called rough paper), such as bond paper or regenerated paper, having coarse fibers and great irregularity on the surface of the paper, toner melted when fixing is performed and thus having a low viscosity is introduced into concave portions of the paper. Thus, there arises a problem in that convex portions in the regions which must be image portions and in which the surface of the paper must be covered with the toner are exposed in the image portions and thus the quality of the image deteriorates. What is worse, resin in the toner permeates fibers in the paper and thus luster becomes non-uniform along the fibers in the paper. As a result, there arises a problem of deterioration in the quality of the formed image.

To prevent the foregoing problems attributable to the thickness of the toner image, a structure in which the thickness of the toner image is reduced has been considered. However, the color development characteristic must be improved while reducing the thickness of the toner image because the image must have sufficiently high image density in order to obtain visibility of the image and practical image quality. In recent years, toner having significant coloring power has been investigated. Even if toner of the foregoing type is employed, it is preferable that a method of stacking color toners to express a required color be employed to cover the recording medium, such as paper, and obtain satisfactory color development characteristic while realizing high image resolution. Thus, the foregoing method involves a fact that the toner image on the image receiving sheet must have two or three layers. The toner having great coloring characteristic contains a coloring matter by about 6 wt % to 40 wt % which is about two to five times the quantity in the conventional toner in order to improve the coloring power. In general, pigment having excellent weathering resistance and heat resistance is generally employed as the coloring matter. However, the pigment cannot be dissolved by the binding resin which is one main components of the toner. The pigment exists in the toner in a state where it is dispersed in the binding resin. Therefore, if the quantity of the added pigment is too large, the quantity of the binding resin is correspondingly reduced and the dispersed pigment inhibits flow of the melted resin when the toner is fixed. Thus, there arises a problem of an unsatisfactory fixing ratio of the toner with respect to the recording medium, in particular, an unsatisfactory fixing ratio of the same with respect to a recording medium with which an anchoring effect which can be obtained because resin is introduced into small gaps between fibers of the paper cannot be expected, for example, a special sheet manufactured by forming synthetic resin into a sheet shape or a sheet for an OHP.

To prevent scattering of light caused by the fixed image, it is important to make sufficient smooth the surface of the fixed image and to prevent generation of an interface between toner particles of the fixed image, as described above. To realize this, another method has been suggested in which the recording medium is modified.

As a conventional structure of an image receiving sheet having an image receiving layer with which toner is fixed to the surface of the base sheet, a structure has been disclosed in U.S. Pat. No. No. 3,944,710 in which adhesivity between a transparent image receiving sheet and a multi-color image formed by toner is improved by forming a thin layer made of resin having a relatively low melting point on the surface of the image receiving sheet. However, there arises a problem in that the simple improvement of the adhesivity between the image receiving sheet and the image formed by the toner is insufficient to obtain satisfactory color development characteristic and transparency.

In U.S. Pat. Nos. 4,337,303 or 4,529,650, a structure has been disclosed in which the transparency of an image is improved by transferring a toner image to a transparent image receiving sheet having an image receiving layer on the surface thereof and simultaneously embedding the toner image in the image receiving layer which has been softened so as to fix the image. However, the above-mentioned structure capable of smoothing the surface of the fixed image by embedding the toner image in the image receiving layer cannot remove the interface between toner particles or between the toner and resin in the image receiving layer. In particular, the structure in which the toner is embedded in the image receiving layer encounters a problem in that an interface can easily be generated between toner and the resin in the image receiving layer. Therefore, there arises a problem in that satisfactory color development characteristic and transparency cannot be obtained.

The above-mentioned structure is formed such that the toner image is transferred and simultaneously it is embedded in the image receiving layer. Therefore, the image carrier for holding the toner image must be made of a material having a satisfactory heat resistance to prevent deterioration due to heat for softening the image receiving layer and excellent releasing characteristic to prevent adhesion of the image carrier and the softened image receiving layer. Therefore, there arises a problem in that selection of materials is limited and high-cost material must be employed.

In U.S. Pat. No. No. 5,378,576, a structure has been disclosed in which the surface of the fixed toner image is smoothed to prevent generation of pseudo outline due to irregular surface of the image and which has the steps of forming a resin layer on the surface of the image receiving sheet, the resin layer being composed of resin classified into a similar system in terms of the chemical structure to that of the resin in the toner and having a melting viscosity which is lower than that of the toner. The above-mentioned structure uses the resin, having the melting viscosity which is lower than that of the toner, to form the resin layer to discharge a portion of the resin layer when an image is fixed to the resin layer so as to smooth the boundary between the toner image portion and the non-image portion in order to prevent generation of the pseudo outline due to the irregular surface of the surface of the image.

However, the above-mentioned structure is formed such that the resins classified into similar systems in terms of the chemical structure are used as the resin forming the toner and that forming the resin layer so as to improve the affinity and the compatibility of the resins which are realized when they are melted. In order to prevent generation of an interface between the toner and the resin forming the resin layer, only consideration of the state where the resin forming the toner and the resin forming the resin layer are melted, that is, the fixed state is insufficient to prevent the problems in that satisfactory color development characteristic and transparency cannot be obtained.

Further, the foregoing structure must use toner having considerably low melting viscosity when the image is fixed to perfectly fuse the toner particles when gaps among the toner particles are attempted to be removed to prevent generation of the interface between the toner particles. Toner of a type having the foregoing thermal melting characteristic cannot stably be reserved. Moreover, also the realized mechanical strength is unsatisfactory. Therefore, there arises a problem in that melting and adhesion, that is so-called filming takes place in a press contact portion between a developing roller and a restraining blade disposed to be in contact with the developing roller and a press contact portion between the image carrier and the cleaning blade positioned in contact with the image carrier. Moreover, when the toner having a considerably low melting viscosity when fixing is performed is fixed to a recording medium, such as bond paper or regenerated paper, made of coarse fibers and involving great irregularity of the surface of the paper, the molten toner is introduced into the concave portions of the paper. Thus, regions of the paper to be covered with the toner to form the image are exposed in the image regions. As a result, there arises a problem in that the quality of the image deteriorates.

Further, as viewed from other aspect of the problem, color images have been required in the business field in recent years and thus a high quality color image is required to be formed on a rough paper, such as regenerated paper. To form a high quality image free from irregular luster and lacking of an image on the foregoing rough paper, use of toner having binding resin which has high viscosity when melted (specifically, having a high storage elastic modulus) has been considered. However, toner of the foregoing type raises a problem in that toner cannot sufficiently be made compatible when fixing is performed and thus an interface is generated between toner particles. Thus, the transparency and the color development characteristic are unsatisfactory. The foregoing problem becomes critical when an image is formed on an image receiving sheet for an OHP.

Since the rough paper has considerable irregularity on the surface thereof, the toner image cannot uniformly be transferred when the toner image is transferred to the surface of the paper. Thus, defective transference, such as non-uniform transference, takes place and thus there arises a problem in that a satisfactory image cannot be formed. The foregoing problem becomes critical with an apparatus of a type for forming a color image by forming a final image by stacking color images in a plurality of colors.

In recent years, the trend of wide use of color images in the business field arises a requirement for outputting color images at high speed, continuously and in a large quantity. To satisfy the foregoing requirements, durability and fluidity of toner are required to be improved. Specifically, materials and the quantity of inorganic or resin particles to be externally added to the surface of toner particles, that is, a so-called external additive are adequately adjusted. In particular, the quantity of the external additive has been enlarged.

When the quantity of the external additive is enlarged, the durability and fluidity of the toner can be improved and the transference efficiency can be raised. However, if the quantity of the external additive is enlarged, scattering of light and irregular reflection take place in the interface (a so-called grain boundary) between toner particles or an interface between toner and the image receiving layer or on the surface of the image. As a result, the light transparency deteriorates and the color development characteristic and the transparency deteriorate, thus causing a problem to arise in that a projected image is blackened on the image receiving sheet for an OHP. Therefore, there arise a problem in that an image having satisfactory color development characteristic and transparency cannot easily be obtained on luster paper and OHP film.

Moreover, an electrophotographic printer has been required to have further raised printing speed in order to reduce the size, save energy and to have performance superior to that of the ink jet printer. In view of the foregoing, the fixing means for heating and melting toner to fix the image on the recording paper must be able to fix the image while requiring smaller heating value. However, since a luster image can generally be formed only when the toner is sufficiently melted by the fixing means to make the surface to be smooth, a large heating value is required to fix the image. If the surface of the image is attempted to be made smooth with a small heating value, resin having a considerably low softening point must be used to form the toner or the image receiving layer of the image receiving sheet. Moreover, since the offset resistance and blocking resistance must be considered in addition to the smoothness, the thermal characteristic of the resin must be designed in a complicated manner.

Moreover, consideration must be performed to realize adequate winding of the sheet and conveyance easiness. Therefore, the image forming apparatus required to form a high quality image including the satisfactory luster property must use optimized toner and a fixing means as well as the image receiving sheet.

To satisfy the above-mentioned requirements, Japanese Patent Publication No. Hei. 2-263642 has disclosed a transparent laminate film comprising a transparent resin layer having a solubility parameter of 9.5 to 12.5 and a storage modulus (G') of 100 $dyn/cm^2$ to 10000 $dyn/cm^2$ at 160° C. In accordance with the above-mentioned disclosure, resin having a storage modulus (G') greater than that of the binding resin forming the toner is employed as the transparent resin layer so that the light transmittance is improved.

According to Japanese Patent Publication No. Hei. 8-194394, the preferred range of the solubility parameter is 10 to 13 and that of the storage modulus (G'2) of the resin in the surface layer of the transfer paper with respect to the storage modulus (G'1) of the toner at 150° C. is G'1−15 to G'1+150.

In Japanese Patent Publication No. Hei. 4-212168, a fact has been disclosed that the loss tangent of the resin in the coating layer is greater than that of toner or the resin for the toner.

However, the transparent resin layer disclosed in Japanese Patent Publication No. Hei. 2-263642 discusses the viscoelasticity realized when the fixing process is performed with only the storage modulus. In view point of the rheology, parameters, such as loss modulus (G") mainly indicating the characteristicas a viscous member and loss tangent indicating status change from the elastic deformation to the viscous deformation, must additionally be considered to perform advanced design and optimization. Similar facts are applied to the methods disclosed in Japanese Patent Publication No. Hei. 8-194394, Japanese Patent Publication No. Hei. 4-125567. In a case where resin having a storage modulus greater than that of the binding resin forming the toner is employed to form the transparent resin layer, manufactured toner has a low melting point and melting viscosity to perform the fixing process with the above-mentioned small heating value. Thus, the fluidity and the blocking resistance of the toner deteriorate, thus causing the amount of deformation of the toner particles to be enlarged considerably when the image has been fixed. In this case, a sharp image cannot be formed because dots and hair lines are deformed and spread. Moreover, the image forming apparatus involves a multiplicity of processes which are affected by filming and thus the apparatus must bear greater total load.

Although the value of the loss tangent of the toner or the resin for the toner and that of the resin in the coating layer have been discussed in Japanese Patent Publication No. Hei. 4-212168, the actual fixing characteristic is greatly affected by the relationship of the peak of the loss tangent indicating the status change of the resin with respect to the fixing temperature or the peak of the loss tangent of the toner because the loss tangent (G"/G') is the ratio of the loss modulus (G") and the storage modulus (G'). That is, the temperature at which the peak is attained is more important than the comparison at a certain temperature.

As described above, although a variety of structures of the image forming apparatus for outputting a color image and the image receiving sheet to be applied to the foregoing apparatus have been suggested, there arises a problem in that a high quality image having the color development characteristic and transparency equivalent to the silver salt photography cannot be obtained.

SUMMARY OF THE INVENTION

In view of the foregoing, an object of the present invention is to provide an image receiving sheet or an image forming apparatus capable of obtaining satisfactory color development characteristic, transparency, surface smoothness and offset resistance.

There is provided an image receiving sheet comprising: a base sheet; and an image receiving layer formed on the base sheet and made of resin, an image being formed by embedding color toner in the image receiving layer; wherein distribution of molecular weight of the resin of the image receiving layer measured by gel permeation chromatography (GPC) of soluble matters of tetrahydrofuran (THF) has at least two peaks or two shoulders, or at least one peak and one shoulder.

There is provided an image forming apparatus comprising: developing means for accumulating a toner; and fixing means for fixing the toner to an image receiving sheet; wherein the image receiving sheet has an image receiving layer being formed on a base thereof and to which the toner can be fixed, the toner comprises at least an external additive, and critical surface tension of the image receiving layer is smaller than critical surface tension of the external additive.

There is provided an image receiving sheet comprising: a base; and an image receiving layer which is formed on the base and on which a toner image can be fixed; wherein the image receiving layer has a storage modulus (G') of $1\times10^2$ Pa to $1\times10^5$ Pa and a loss modulus (G") of $1\times10^2$ Pa to $1\times10^5$ Pa at temperatures at which the toner is fixed.

There is provided an image forming apparatus comprising: developing means for accumulating a toner; and fixing means for fixing the toner to an image receiving sheet, the image receiving sheet having an image receiving layer being formed on a base thereof and to which the toner can be fixed; wherein the image receiving layer has a storage modulus (G') of $1\times10^2$ Pa to $1\times10^5$ Pa and a loss modulus (G") of $1\times10^2$ Pa to $1\times10^5$ Pa at temperatures at which the toner is fixed.

There is provided an image receiving sheet comprising: a base; and an image receiving layer being formed on the base and to which an image can be fixed; wherein the image receiving layer is composed an aromatic ester compound.

There is provided an image forming apparatus comprising: an image carrier; transfer means for transferring a toner image formed on the image carrier to an image receiving sheet; and fixing means for fixing the image onto the image receiving sheet; wherein the image receiving sheet has an image receiving layer formed on a base thereof, and the image receiving layer is composed of at least an aromatic ester compound.

There is provided an image receiving sheet comprising: a base; and an image receiving layer being formed on the base and to which a toner image can be transferred; wherein the Rockwell hardness (an R scale) HRa of the image receiving layer is 121 or less.

There is provided an image forming apparatus comprising: an image carrier; transfer means for transferring a toner image formed on the image carrier to an image receiving sheet; and fixing means for fixing the image to the image receiving sheet; wherein the receiving sheet has an image receiving layer formed on a base thereof, the Rockwell hardness (an R scale) HRa of the image receiving layer is 121 or less and the transferring means urges the image receiving sheet against the image carrier.

DETAILED DESCRIPTION OF THE PREFERRED EMBODIMENTS

Figure 1A:
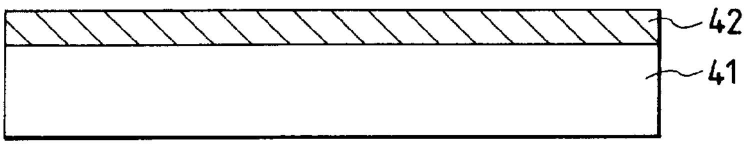
FIG. 1(*a*) shows a structure in which an image receiving layer is formed on a base, and FIG. 1(*b*) shows a structure in which the image receiving layer is composed of two types of resins having different distribution of the molecular weights.
Figure 1B:
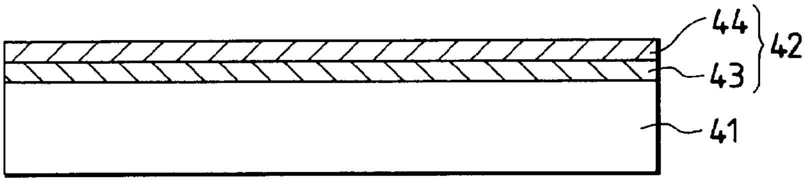

An image receiving sheet according to the present invention will now be described with reference to the drawings. FIGS. 1(*a*) and 1(*b*) show the basic structures of the image receiving sheet according to the present invention, and FIG. 1(*a*) shows a structure in which an image receiving layer 42 is formed on a base 41.

FIG. 1(*b*) shows a structure in which the image receiving layer 42 is composed of two types of resins having different distribution of the molecular weights. It is preferable that the two types of the resins be resins in the same system having approximate degrees of refractivity. The above-mentioned structure is able to obtain an excellent offset and blocking resistance if high molecular weight component is employed to form an upper layer portion 44. If low molecular weight component is employed to form the upper layer portion 44, an advantage is realized to embed the toner. Thus, an image having excellent surface smoothness and satisfactory transparency can be obtained after the toner has been fixed. Therefore, change of the relationship of the molecular weight enables the characteristic of the image receiving sheet to easily be controlled. If solvent for dissolving a lower layer portion 43 is used when the upper layer portion 44 is applied, the interface between the upper layer portion 44 and the lower layer portion 43 are harmoniously integrated and thus the refractivity is changed smoothly from the upper layer to the lower layer. Therefore, scattering of light can be prevented and therefore the transparency can furthermore be improved.

The structure of FIG. 1(*a*) is applied to the all embodiments in this invention, and the structure of FIG. 1(*b*) is applied to the embodiments in section (1) described later.

The base 41 for use in the image receiving sheet according to the present invention may be known resin, paper or the like. For example, any one of the following materials are employed: a polyester film, such as polyethylene terephthalate (PET); a polyolefin film, such as a polyethylene film or a polypropylene film; any one of various acrylic films including a polycarbonate film, a triacetate film, a polyether sulfon (PES) film, a polyether etherketone (PEEK) film, a vinyl chloride film and methylmethaacrylate; and a cellophane film. It is preferable that a colorless and transparent base be employed. When the image receiving sheet is employed as the image receiving sheet for an OHP, it must be transparent. If necessary, luster paper prepared by dispersing white pigment, such as titanium oxide, in the foregoing resin may be employed as reflecting member.

As the material for the base, it is preferable to use the polyester film because of its mechanical strength and thermal strength and cost. The thickness of the base sheet for use in the above-mentioned purpose is arbitrarily determined in consideration of the recording means and the required strength, the thickness is usually 50 $\mu$m to 300 $\mu$m, preferably 80 $\mu$m to 120 $\mu$m. In this embodiment, a member formed into a film having a thickness of 100 $\mu$m is employed unless otherwise specified.

The resin for forming the image receiving layer 42 contains transparent resin as the main component thereof and preferably it is resin which can be formed into a coating film. For example, polyester resin, polystyrene resin, polyacrylate, styrene-methacrylate resin, polyamide resin, cellulose resin, such as cellulose acetate, polycarbonate resin, polyolefin resin, polyvinyl chloride, polyvinylidene chloride, polyvinyl acetate, vinyl chloride/vinyl acetate copolymer, copolymer of olefin, such as ethylene and propylene and another vinyl monomer, ionomer and ethylcellulose. Among the foregoing materials, it is the most preferable that resin in the same system as that of the resin forming the toner be employed in consideration of the compatibility with the toner and the wettability. In order to prevent the resin forming the image receiving layer together with the toner when fixing is performed to form an interface, it is an important fact that the resin for forming image receiving layer is softened when fixing is performed. Therefore, it is preferable that thermoplastic resin be employed as the resin which is fused with heat when fixing is performed. In view of a fact that the resin for forming image receiving layer is softened when fixing is performed, a thermosetting resin (for example, a mixture prepared by mixing a crosslinking agent with thermoplastic resin) which has not been hardened may be employed. Although the foregoing material has wear resistance of the surface of the fixed image superior to that of the thermoplastic resin, the foregoing resin has a problem of reservation stability (natural hardening due to environment temperature or deactivation of the crosslinking material) in a pre-fixed state. Therefore, it is preferable that thermoplastic resin be employed. Specifically, the base of the image receiving sheet or the image receiving layer is exemplified by any one of the following transparent resins: polyethylene terephthalate may be, for example, FR-PET (having Rockwell hardness R of 127 to 130) manufactured by Teijin Limited, polyallylate resin may be, for example, U-Polymer manufactured by Unichika Ltd. (having Rockwell hardness R of 125), polycarbonate resin may be, for example, U-Pylon S2000 (having Rockwell hardness R of 122 to 124) manufactured by Mitsubishi Gas Chemical Company Inc., polyether sulfonic resin may be, for example, resin of this type manufactured by Sumitomo Chemical Company, Limited (having Rockwell hardness R of 120), ethylene-vinyl chloride copolymer may be, for example, Nissan Vinyl E manufactured by Nissan Chemical Industries, Ltd. (having Rockwell hardness R of 114), polyvinyl chloride may be, for example, PE1095 manufactured by Nippon Zeon Co., Ltd. (having Rockwell hardness R of 108), ABS resin may be, for example, Denka ABS (having Rockwell hardness R of 105) manufactured by Denki Kagaku Kogyo Kabushiki Kaisha, polymethylpentene resin may be, for example, TPX manufactured by Mitsui Petrochemical Industries, Ltd. (having Rockwell hardness R of 100), polypropylene may be, for example, Chisso Polypro (having Rockwell hardness R of 95) manufactured by Chisso Corporation, cellulose acetate resin may be, for example, Acecti (having Rockwell hardness R of 91) manufactured by Daicel Chemical Industries, Ltd., aromatic polyester resin may be, for example, Econol E2000 (having Rockwell hardness R of 88) manufactured by Sumitomo Chemical Company, Limited. If necessary, a variety of additives may be dispersed or solved to the base of the image receiving sheet for an OHP or the image receiving layer in a quantity which does not deteriorate transparency. If necessary, white pigment, such as titanium oxide, may, of course, be dispersed in the resin forming the base of the image receiving-sheet similar to general paper.

The image receiving layer 42 may, if necessary, contain an antistatic agent, a surface active agent, a dispersant, a lubricant, a matting agent and a plasticizer, which may be added in a range which does not critically inhibit the transparency. Then, a composition is prepared by dissolving the foregoing material into an adequate solvent or by dispersing the same, followed by applying the composition by a known method such as bar coating, and followed by drying the product.

If necessary, an antistatic layer, a blocking preventive layer, an adhesive layer and a surface protective layer having wear resistance may be provided for the image receiving sheet.

In this embodiment, layers formed on the surface on the base for receiving the toner and arranged to receive the toner when fixing is performed are collectively treated as an image receiving layer.

It is preferable that the thickness of the image receiving layer be larger than 50% of the volume average particle size of the toner. By employing the foregoing structure to sufficiently embed the toner in the image receiving layer when fixing is performed, the surface of the fixed toner image can be smoothed because the toner is embedded in the image receiving layer, in addition to the fact that the image receiving layer serves as an adhesive layer for only improving the adhesivity between the base and the toner. Moreover, gaps between toner particles are plugged by the resin for forming the image receiving layer so that an image having excellent color development characteristic and transparency is formed. If the thickness is smaller than the above-mentioned value, irregular surfaces of the image and gaps between toner particles cannot satisfactorily be plugged when the toner has been embedded. The average value of the minimum particle size of a marketing toner is about 6 $\mu$m to 7 $\mu$m. Therefore, the thickness of the image receiving layer is required to be 3 $\mu$m or larger, preferably 10 $\mu$m or larger. If the image receiving layer is too thick, shift and deformation of the image take place when the image is fixed and thus the quality of the image is adversely affected. Therefore, it is preferable that the thickness of the image receiving layer be about 100 $\mu$m or smaller, preferably 50 $\mu$m or smaller.

The image receiving sheet according to this embodiment has a multi-layered structure consisting of the base and the image receiving layer as shown in FIGS. 1(*a*) and 1(*b*). The present invention is not limited to this. For example, a single structure may be employed in which the base also serves as the image receiving layer. However, it is preferable that a multi-structured image receiving sheet formed by stacking the image receiving layer on the base be employed.

The embodiment of the present invention will now be described with reference to the drawings such that an apparatus for forming a color image is employed as an example.

Figure 2:
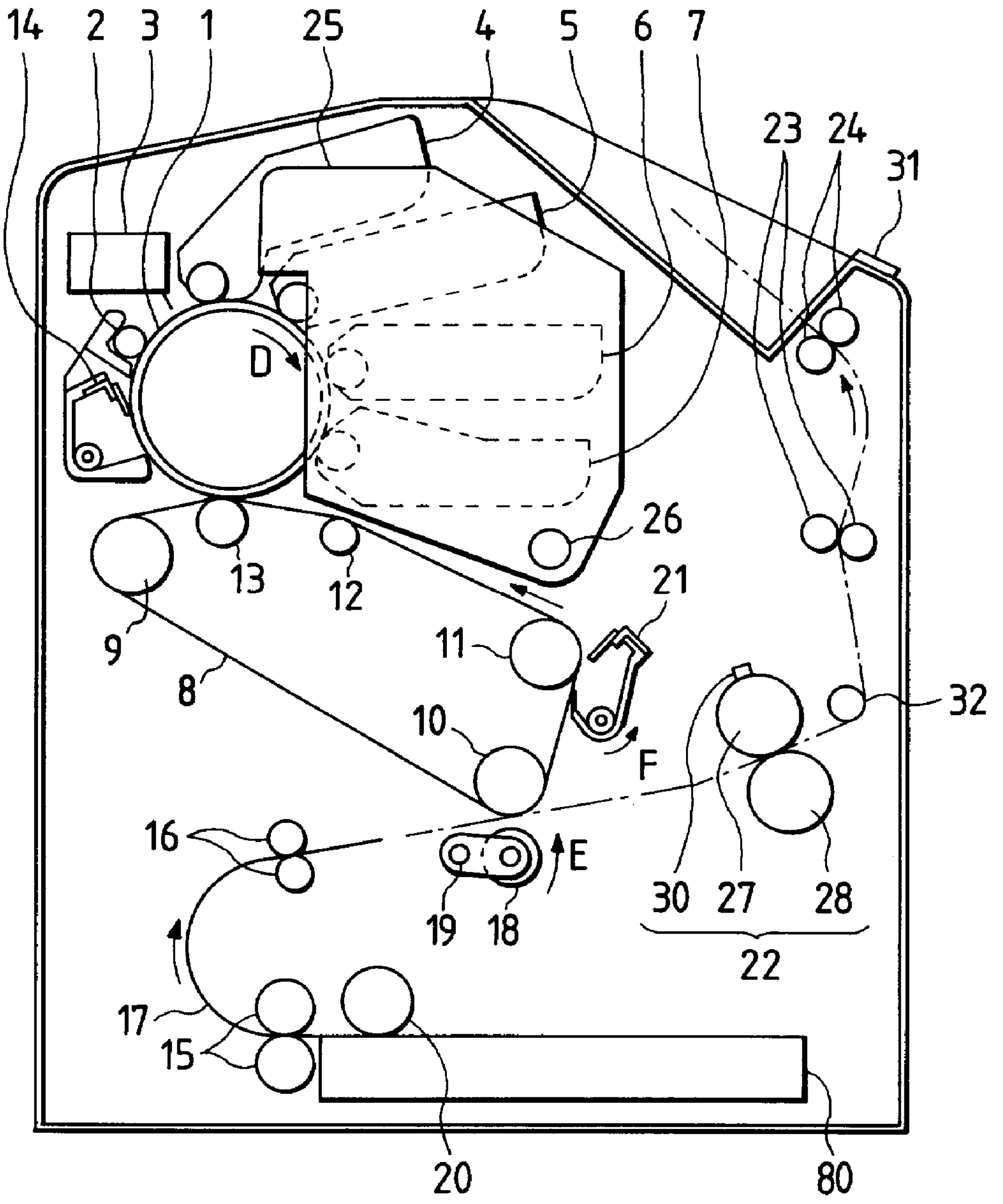
FIG. 2 shows a cross sectional view showing the overall structure of an image forming apparatus according to the present invention.

FIG. 2 is a cross sectional view of the image forming apparatus according to the present invention, the apparatus being a color image forming apparatus comprising belt-shape intermediate transfer member.

Referring to FIG. 2, the overall structure and the operation of the apparatus according to the present invention will now be described.

Referring to FIG. 2, a drum-shape photosensitive member 1 (an image carrier) is rotated by a power source, such as a motor (not shown) in a direction indicated by an arrow D. The photosensitive member 1 has an outer surface on which a charging means 2, such as a charging roller, is disposed so as to be rotated and brought into contact with the photosensitive member 1 so that the surface of the photosensitive member 1 is uniformly charged.

The photosensitive member 1 having the surface, which has been charged uniformly, is selectively scanned and exposed to light in accordance with image information of, for example, a yellow image, which is the first color, by a latent image forming means 3 comprising, for example, a laser scanning optical system so that an electrostatic latent image for the yellow image is formed.

Developing means 4, 5, 6 and 7 respectively accumulating yellow, magenta, cyan and black toners serving as developers and structured to be brought into contact with the photosensitive member 1 and to be moved apart from the same are disposed downstream of the photosensitive member 1 having the electrostatic latent image formed thereon in the direction of the rotation. The formed electrostatic latent image for the yellow image is developed because only the yellow developing means 4 is brought into contact with the photosensitive member 1 so that a yellow toner image is formed.

An intermediate transfer belt 8 is disposed adjacent to the photosensitive member 1 at a position in the downstream direction of the photosensitive member 1 in the direction of the rotation. The intermediate transfer belt 8 is wound around a drive roller 9, a backup roller 10, a tension roller 11 and a crease recovery roller 12 so as to be driven at the same speed as the circumferential speed of the photosensitive member 1. When the drive force of the photosensitive member 1 is transmitted to the drive roller 9, the photosensitive member 1 and the intermediate transfer belt 8 are synchronously driven.

A primary transfer roller 13 is urged to the photosensitive member 1 through the intermediate transfer belt 8. When voltage is applied to the primary transfer roller 13 from a high voltage power source (not shown) at a primary transfer position at which the intermediate transfer belt 8 is held by the photosensitive member 1 and the primary transfer roller 13, the yellow toner image formed by the above-mentioned procedure is transferred to the surface of the intermediate transfer belt 8.

The photosensitive member 1, from which the yellow toner image has been transferred to the intermediate transfer belt 8, is further rotated in a direction indicated by the arrow D. Then, toner left on the surface of the photosensitive member 1 is wiped off by a cleaner 14 for the photosensitive member 1 comprising a cleaner blade to permit an image to be formed again.

A similar process is repeated for the second to fourth color images (magenta, cyan and black) so that the four color toner images are sequentially overlapped and recorded on the intermediate transfer belt 8.

After four color images have been overlapped on the intermediate transfer belt 8, a recording medium 17 is fed from a paper cassette 80 (a recording medium accommodation means) by a paper feeding roller 20 and paper feeding roller pair 15 and 16. In synchronization with this, a clutch mechanism and a cam mechanism (not shown) rotate a secondary transfer roller 18 around a secondary transfer support shaft 19 in a direction indicated by an arrow E so as be brought into close contact with a backup roller 10 through the intermediate transfer belt 8. When voltage is applied from a high voltage power source (not shown) to the secondary transfer roller 18 at a secondary transfer position at which the recording medium 17 and the intermediate transfer belt 8 are held between the backup roller 10 and the secondary transfer roller 18, four color toner images on the intermediate transfer belt are collectively transferred to the recording medium 17. A cleaner 21 for the transfer member composed of a cleaner blade or the like is, by a clutch mechanism and a cam mechanism (not shown), rotated in a direction indicated by an arrow F and brought into contact with the intermediate transfer belt 8 which has completed the secondary transfer. Thus, toner left on the surface of the intermediate transfer belt 8 is wiped off. After wiping has been completed, the cleaner 21 for the intermediate transfer member is rotated in a direction opposite to the direction indicated by the arrow F so as to be retracted.

The recording medium 17 to which the four color toner images have been transferred is moved from the secondary transfer position to a fixing means 22 through a first recording medium conveyance passage for conveying the recording medium 17 substantially in parallel to the body of the apparatus, and then held and conveyed by the fixing means 22 while being heated and pressurized by the same. Thus, the toner images are fixed. The conveying direction of the recording medium onto which the toner images have been fixed is changed toward the upper surface of the body of the apparatus by a paper conveyance roller 32 after the recording medium 17 has passed through the fixing means 22. Then, the recording medium 17 is discharged to the upper surface of the apparatus by paper discharge roller pair 23 and 24 disposed on a second recording-medium conveyance passage through which the recording medium 17 is conveyed from the fixing means 22 in a direction substantially perpendicular to the body of the apparatus and which reaches the upper surface of the apparatus. Thus, the color image recording process is completed.

Some structures of the apparatus shown in FIG. 2 and according to this embodiment will now supplementarily be described.

A control panel 31 for displaying instructions for controlling the image forming apparatus and states of the image forming apparatus is disposed on the front cover of the body of the apparatus.

The developing means 4, 5, 6 and 7 are detachably supported by a frame 25. The frame 25 has a structure so as to be supported rotatively around a frame support shaft 26.

The fixing means 22 comprises a heat roller 27 (heating member) including a heating means, such as a halogen lamp, a first pressurizing roller 28 and a releasing-agent apply means 30 in the form of a pad or a roller for applying a releasing agent, such as silicon oil, to the heat roller 27 or cleaning the surface of the heat roller 27.

If necessary, either or both of the heating member (heat roller 27) or the pressing member (pressurizing roller 28, 29) may have adequate hardness elasticity. To achieve this, an elastic rubber layer made of silicon rubber or a fluorine rubber is required to be provided on the surface of each member. In order prevent adhesion of toner to the surface of each of the heating member and the pressing member or to prevent adhesion (so-called offset) of the image receiving sheet to the image receiving layer, a releasing characteristic may be given. To achieve this, it is preferable that a low surface energy coating layer having excellent heat resistance be provided for either or both of the surfaces of the heating member and the pressing member, the layer being made of polyvinylidene fluoride, polytetrafluoroethylene, tetrafluoroethylene-perfluoroalkyl vinyl ether copolymer or the like.

Since the fixing means presses the heating member and the pressing member, the press contact portion can easily be formed if an elastic member is employed. Moreover, pressure distribution can be realized in the press contact portion. If the pressing member has elasticity and the JISA hardness is smaller than 15°, the amount of deformation becomes excessive and thus a problem arises in conveying the image receiving sheet. If the JISA hardness exceeds 80°, surface deformation is reduced and thus pressure is concentrically applied to the press contact portion. As a result, permanent deformation, such as creases and curls of the image receiving sheet, is generated.

In a case where an elastic material is employed to form the heating member as a member with which toner on the image receiving layer is brought into directly contact, the surface of the heating member is deformed to correspond to the waviness of the surface of the non-fixed toner image when the member presses the surface of the toner image. Therefore, the toner image can uniformly be heated and pressed and thus a luster and uniform image can be obtained. If the JISA hardness is smaller than 15°, the amount of deformation becomes excessive. Thus, pressure for pressing the toner cannot satisfactorily be applied, thus causing a problem of smoothness to arise. If the JISA hardness exceeds 80°, the surface cannot satisfactorily be deformed. Therefore, toner cannot uniformly be heated and the luster becomes irregular. The JISA hardness is hardness measured in accordance with JIS K6301.

In this embodiment, the fixing means 22, unless otherwise specified, comprises a heating member 27 which is a heat roller (having a diameter of 40 mm and a length of 25 cm) having a PFA coating layer (surface roughness Ra: 0.1 $\mu$m and average interval between crests Sm: 30 $\mu$m) having JISA hardness of 50°; and the pressing member 28 which is a pressurizing roller (having a diameter of 40 mm and a length of 25 cm) provided with a silicon rubber layer having JISA hardness of 70°. A pressure of 3 kgf/$cm^2$ is applied by using a spring so that the width of the press contact portion (the length of a nip) between the heat roller and the pressurizing roller is made to be 4 mm. As the releasing agent, silicon oil is applied to the surface of the heat roller. The fixing temperature was set such that the surface temperature of the heat roller was set in such a manner that the surface temperature of the image receiving sheet immediately discharged from the press contact portion of the fixing means was made to be 140° C. when measured by a radiation thermometer. The conveyance speed of the image receiving sheet is, in terms of the linear speed, 10 mm/sec when the sheet is supplied to the fixing means. As a matter of course, the present invention is not limited to this. The fixing means 22 may be a known fixing means except that according to this embodiment. For example, the fixing means 22 may have a plurality of pressurizing rollers to serve as the pressing members. By increasing the number of the members, a plurality of press contact portions can easily be realized. Thus, high speed fixing can be performed so that a high quality image having excellent color development characteristic and transparency is formed. Moreover, a plate-like or a roller shape guide member may be provided between the plural press contact portions to serve a the conveyance passage for the recording medium 17.

The structure of the image forming apparatus according to the present invention having the fixing means arranged to perform a high speed operation and save electric power will supplementarily be described with reference to FIG. 3.

The fixing means 22 is provided with the first pressurizing roller 28 and a second pressurizing roller 29 provided for the heat roller 27 including a heating means such as a halogen lamp. Moreover, the fixing means 22 has the pad or roller shape releasing-agent apply means 30 for applying a releasing agent, such as silicon oil, to the heat roller 27 or cleaning the surface of the heat roller 27. Each pressing member is pressed against the heat roller 27 by a pressing means, such as a spring so that two press contact portions are formed. By increasing the pressing members, a plurality of press contact portions can easily be obtained. A guide may be provided between press contact portions to serve as a conveyance passage for the recording medium 17.

Since the image forming apparatus according to the present invention has the fixing means provided with at least two press contact portions, pressing of the toner against the image receiving layer can be performed plural times in the press contact portions. Therefore, satisfactory smoothness of the surface of the image can be obtained. By increasing the press contact portions, an image forming apparatus having an advantage can be realized when high speed operation and power saving structure are required.

The apparatus according to this embodiment is structured such that an angle made by the first pressurizing roller 28 to the second pressurizing roller 29 from the center of the heat roller 27 is made to be 45° or larger. Since the angle made by the first pressurizing roller 28 to the second pressurizing roller 29 is made to be 45° or larger, the recording medium can sufficiently be wound around the heat roller 27. Therefore, toner can satisfactorily be melted even if a color image having light transmittance is formed on a recording material having a transparent base so that an image having excellent color development characteristic and light transmittance is formed. Since the angle made by the first pressurizing roller 28 to the second pressurizing roller 29 is made to be 90° or smaller, clogging of the recording material in the fixing means 22 can be prevented even if a rigid recording material, such as a plastic film, is used to form a transparent image. Unless otherwise specified, time of contact between the image receiving sheet and the heat roller is 40 ms and the temperature of the surface of the heat roller is 180° C. As a matter of course, the present invention is not limited to the foregoing values. The fixing means 22 may be a known fixing means except for that according to this embodiment.

A press contact portion (N1) of the plural press contact portions of the fixing means which has the largest pressure is disposed downstream of a press contact portion (N2) having second pressure in the direction in which the image receiving sheet is conveyed. As described above, it is preferable that the pressure distribution in the press contact portion is made such that the distribution is not too sharp and too broad and the portion is divided into a portion for heating and softening the image receiving layer and a portion for forcibly pressing the toner against the image receiving layer. From this viewpoint, a structure in which heating is performed in the upstream press contact portion and the press contact portion having the highest pressure performs the pressing step so as to obtain an image having excellent smoothness efficiently.

Moreover, the following relationship is satisfied when the distance for which the image receiving sheet is moved between the most upstream press contact portion (Ns) and the most downstream press contact portion (Ne) in the direction in which the image receiving sheet is conveyed is Kse and the distance for which the image receiving sheet is moved between the most upstream press contact portion (Ns) and the press contact portion (N1) having the highest pressure is Ks1: $Kse/2 \leqq Ks1$. When a plurality of the press contact portions are formed, the plurality of the pressing members can be brought into contact with one heating member. When the image receiving sheet is moved to a next press contact portion while maintaining the contact with the heating member, heat can efficiently be used. When a press contact portion having the highest pressure is provided in a rear portion from the center of the movement distance in the state where the image receiving sheet is heated to press the toner against the image receiving layer, heat can further efficiently be used.

The heating or pressing member forming the most downstream press contact portion of the plural press contact portions of the fixing means in the direction in which the image receiving sheet is conveyed and arranged to be brought into contact with the image receiving layer has JISA hardness (Mf) has the following relationship with respect to the JISA hardness (Mb) of the other member: $Mf \leqq Mb$. Since also the quality of the image deteriorates when the image receiving sheet is separated from the press contact portion, prevention must be considered. In particular, the shape of the most downstream press contact portion affects the shape of the cooled and solidified image, that is, the smoothness of the surface of the fixed image. The press contact portion must have a shape with which pressure can quickly be released to prevent wavy mark formed due to adhesion of the softened image receiving layer or the toner to the press contact portion. Therefore, the hardness of the member which is brought into contact with the image receiving layer is made to be smaller than that of the other members so that the press contact portion is formed into a shape warped in a direction in which the image receiving layer of the image receiving sheet is separated from the press contact portion. Thus, an image free from wavy creases and having satisfactory smoothness can be formed. The foregoing fact is advantageous to prevent winding of the image receiving sheet because the foregoing direction is the direction in which the image receiving sheet is separated.

The image carrier according to the present invention is structured to hold a toner image to be transferred to the recording medium 17 which is the image receiving sheet. In the image forming apparatus shown in FIGS. 2 and 3, the image carrier is an intermediate transfer belt 8. Similarly, the transferring means according to the present invention is structured to transfer a toner image from the image carrier to the recording medium 17 which is the image receiving sheet. In the image forming apparatus shown in FIGS. 2 and 3, the transferring means is the secondary transferring roller 18.

Figure 3:
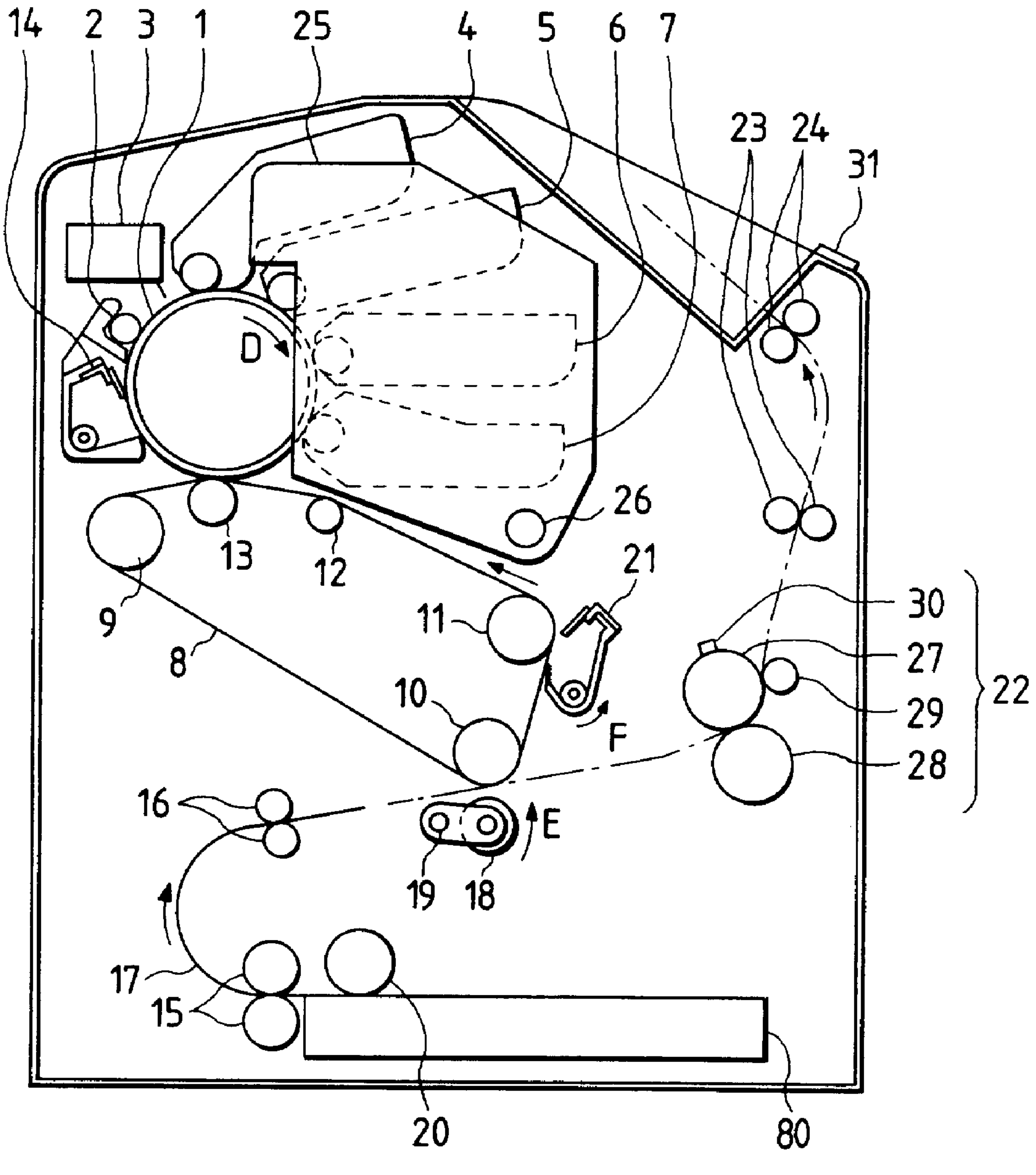
FIG. 3 shows a cross sectional view showing the overall structure of the image forming apparatus of a type having a fixing unit comprising a plurality of press contact portions.

As a matter of course, the image forming apparatus according to the present invention is not limited to the structure shown in FIGS. 2 and 3. The image forming apparatus may have a structure such that toner images are not transferred from the photosensitive member 1 to the intermediate transfer belt 8 and the same are sequentially overlapped on the recording medium 17 to form a multi-color image. In the image forming apparatus having the above-mentioned structure, the image carrier according to the present invention is the photosensitive member 1. Similarly, the transferring means is the primary transfer roller 13. The methods adaptable to the image forming apparatus having the above-mentioned structure are classified into a method in which color images are formed on the photosensitive member so as to collectively be transferred to the recording medium 17; and a method in which the recording medium 17 is supported on the intermediate transfer belt 8 followed by sequentially transferring toner images on the photosensitive member onto the recording medium so as to form the multi-color image. Both of the foregoing methods usually does not require the secondary transfer roller 18 included in the image forming apparatus shown in FIGS. 2 and 3.

Although this embodiment is structured to use the image forming apparatus for forming the multi-color image, the present invention may be applied to an image forming apparatus for forming a monochrome image.

The toner is in the form of particles composed of at least resin and coloring matter. In order to adjust the fluidity of the toner, inorganic or organic particles each having a size smaller than the size of the toner particle are, as the external additive, allowed to adhere the surfaces of the toner particles. A portion of the external additive is not sometimes allowed to adhere to the toner particle and the same is sometimes made to be free.

The external additive may be particles of metal oxide, such as silicon oxide (silica), aluminum oxide, titanium oxide, strontium titanate, cerium oxide, aluminum oxide, magnesium oxide and chrome oxide; particles of a nitride, such as silicon nitride; particles of a carbide, such as silicon carbide; particles of a metal salt, such as calcium sulfate, barium sulfate and calcium carbonate; particles of a metal salt of fatty acid, such as calcium stearate; particles of resin, such as PMMA, vinylidene fluoride and polytetrafluoroethylene; and particles of carbon black or carbon fluoride. In general, metal oxide particles each having a surface subjected to a hydrophobic treatment is employed. In the hydrophobic treatment, silicon oil or hexamethyldisilazane may be employed.

It is preferable that the external additive be added by 0.1 (wt %) to 5 (wt %) of the toner.

An apparatus capable of outputting an image at high speed such that the circumferential velocity of the photosensitive member is 160 mm/second has a requirement such that toner has sufficiently fluidity. To cause the stirring member to convey the toner and to supply toner to the developing roller disposed at an opening of the developing means opposite to the photosensitive member by a supply roller or the like disposed to be in contact with the developing roller, it is preferable that external additive having a small particle size of 5 nm to 20 nm as the primary particle. When the external additive having a small particle size is added to the toner particles by 1 wt % or more, the conveyance characteristic and the supply easiness can furthermore be improved. By significantly improving the hydophobic characteristic of the surface of the external additive, specifically, by processing the surface of the external additive with hexamethylenedisilazane, the conveyance characteristic and the supply easiness can furthermore be improved. By adding the external additive having a small particle size by 1.5 wt % or more, deterioration of toner occurring due to friction of the restraining member disposed to be in contact with the developing roller to restrain the quantity of the toner on the developing roller and the developing roller and adhesion (filming) of the toner to the developing roller and the restraining member can be prevented. Thus, an effect can be obtained in that the durability is improved.

To improve the durability of the toner in the apparatus capable of outputting an image at high speed such that the circumferential velocity of the photosensitive member is 160 mm/second, it is preferable that external additive having a large average particle size of 30 nm to 50 nm as the primary particles be employed. When external additive having a large particle size is added to the toner particles by 0.5 wt % or more, more preferably 1.5 wt % or more to attain further significant effect. Since the external additive having a large particle size has a relatively low contribution ratio upon the fluidity as compared with the external additive having a small particle size, deterioration of the fluidity of the toner attributable to the external additive having the large particle size is prevented by significantly improving the fluidity of the external additive, specifically, by subjecting the surface of the external additive with silicon oil, in particular, dimethylsilicon oil. Thus, the fluidity can be improved and the durability can be improved. If the external additive having the large particle size is added excessively, the fluidity of the toner, that is, the conveyance characteristic and the supply easiness deteriorate. In this case, history of previous process for forming an image appears in the image. Therefore, it is preferable that the quantity of the external additive having the large particle size be 5 wt % or less.

If the external additive having the small particle size is added excessively in the apparatus capable of outputting an image at high speed such that the circumferential velocity of the photosensitive member is 160 mm/second, the fluidity of the toner becomes excessive. Therefore, leakage of toner from the developing means takes place or the fixing characteristic deteriorates due to the external additive existing on the surface of the toner particles when the toner is fixed to the image receiving sheet. Therefore, it is preferable that the external additive having the small size be added by 3 wt % or lower.

As described above, the external additive may be used solely with respect to the toner. However, the external additives respectively having the large particle size and the small particle size may arbitorarily be mixed in the above-mentioned range. If mixture of plural types of external additives is employed, the durability and the fluidity can be improved.

The fluidity of the toner can be indicated with aerated apparent density. It is preferable that the density be included in a range from 0.3 g/cc to 0.4 g/cc in view point of the fluidity. By making the fluidity to be included in the above-mentioned range, the transference efficiency at the primary transference and secondary transference can be improved. Moreover, disorder of the image attributable to flying of the toner during the transference can be prevented.

Moreover, a releasing agent may be added to the toner. The releasing agent may be resin having a small molecular weight. In particular, resin having a sharp molecular weight distribution and thus the viscosity which is rapidly lowered is preferably employed. It is preferable that polyethylene or polypropylene wax be employed.

It is preferable that the softening point of the toner be 110° C. to 140° C. The reason for this is that the toner can easily be solidified in the developing means or a toner supply container if the softening point of the toner is lower than 110° C. and thus the reservation characteristic deteriorates. In a case where the toner is intended to be embedded in the image receiving layer by the fixing means, heat energy from the fixing means must be enlarged considerably. Thus, problems of high cost and risk for the safety arise.

It is preferable that the ratio (Mw/Mn) of the weight average molecular weight (Mw) and the number average molecular weight (Mn) of the binding resin in the toner be 50 or higher and 150 or lower. If the ratio Mw/Mn of the binding resin in the toner is lower than 50, adhesion (so-called offset) of the toner to the fixing means takes place and thus an excellent fixed image cannot be formed. If the ratio Mw/Mn is higher than 150, high molecular weight components in the resin is enlarged. Thus, the storage elastic modulus is raised when the toner has been melted. As a result, an interface between toner particles can easily be generated, causing color development characteristic and transparency to take place due to irregular reflection of light.

By the way, to compensate the saturation, image density and luster of a color image with the image receiving sheet, the surface of the image must be made smooth and an image receiving layer having a low softening point must be used. However, the image receiving layer having a low softening point arises a problem of offset of the toner and the image receiving layer to the fixing roller when the fixing process is performed. Therefore, the resin for use in the image receiving layer must have smoothness and offset resistance which are antithetic characteristics. That is, it can be considered that resin having a specific rheology characteristic which dynamically acts as a viscous material while maintaining somewhat elasticity as an elastic member when it is fused with heat applied when the fixing operation is performed has an advantage.

The image receiving layer of the image receiving sheet according to the present invention has a storage modulus (G') of $1\times10^2$ Pa to $1\times10^5$ Pa and a loss modulus (G") of $1\times10^2$ Pa to $1\times10^5$ Pa at the temperatures at which said toner is fixed.

As a result of the investigation in the present invention, the storage modulus (G') indicates the elasticity of an elastic member. If the value exceeds $1\times10^5$ Pa, the elasticity is great, thus causing a state where toner cannot be embedded in the image receiving layer to be realized. As a result, a stepped portion is generated between the toner and the image receiving layer. If the value is smaller than $1\times10^2$ Pa, the restoring force is weakened. When the image receiving sheet passes through the fixing unit, "wavy creases" which are small and wavy paper conveyance creases are generated in the surface layer of the image receiving layer. Thus, the smoothness of the surface deteriorates.

The loss modulus (G") indicates dynamic action as a viscous material. If the value exceeds $1\times10^5$ Pa, force, such as high pressure, for melting and deforming the image receiving layer is required. If the value is smaller than $1\times10^2$ Pa, fluidity is enhanced and thus offset of the image receiving layer to the fixing member takes place.

In the present invention, the image receiving layer has a loss tangent (G"/G') which is the ratio of the loss modulus (G") and the storage modulus (G') of 0.01 to 10 at the temperatures at which said toner is fixed. As described above, the loss modulus (G") and the storage modulus (G') respectively indicate the characteristics of the viscous material and an elastic material. The loss tangent (G"/G') which is the ratio of the foregoing modulus is considered to correspond to the stress relaxation time when the material is elastically deformed. If the value is smaller than 0.01, relaxation time is long, the restoring force is strong and the smoothness of the surface of the fixed image is unsatisfactory. If the value exceeds 10, the relaxation time is short and deformation easily takes place. However, the coagulation force is weak and a wavy crease can easily be formed.

The resin in the image receiving layer according to the present invention has at least one peak in a range in which the loss tangent (G"/G'), which is the ratio of the loss modulus (G") and the storage modulus (G'), is 50° C. to 150° C. At the point at which the loss tangent has the peak, the main characteristic of the resin is shifted from the elastic material to a viscous material at the corresponding temperature. If the temperature at which the peak is realized is lower than 50° C., both of the offset resistance and the blocking resistances deteriorate. If the temperature is higher than 150° C., a great heating value and pressure are required to fuse and deform the image receiving layer.

As a method of manufacturing the toner according to the present invention, a method may be employed in which binding resin, pigment and required charge control agent and releasing agent are mixed, and then fuse kneading, pulverization and classification are performed.

The binding resin for forming the toner according to the present invention is not limited particularly and thus any one of a variety of known resins may be employed. For example, polyester resin, styrene resin, acrylic resin and styrene/acrylic resin may be employed.

The coloring matter which is the component of the present invention is not limited particularly. Any one of the following known materials may be employed: carbon black, nigrosine dye, aniline blue, chalcoil blue, ultramarine blue, quinoline yellow, chrome yellow, methylene blue chloride, Dupont oil red, phthalocyanine blue, malachite green oxalate and rose bengal.

To attain fluidity, inorganic particles may be added. As the inorganic particles, it is preferable that inorganic oxide particles of silica, titania or alumina be employed. The employed inorganic particles may be subjected to a hydrophobic process using a silane coupling agent or a titanium coupling agent.

The toner according to the present invention may be employed as non-magnetic and one component toner, two component developer, magnetic and one component developer.

The average particle size of the toner according to the present invention is a volume average particle size which is 4 $\mu$m to 20 $\mu$m, preferably 5 $\mu$m to 15 $\mu$m. Note that the volume average particle size is a value measured by a coal tar counter.

To improve the luster of an image, the elasticity and the viscosity of the toner are generally lowered because the surface of the image must be smoothed. However, since a multiplicity of processes for manufacturing the toner are affected by filming, the above-mentioned reduction must be avoided from a total view point.

The image forming apparatus according to the present invention is able to use toner of a type such that the storage modulus (G') of the image receiving layer is, at the temperatures at which said toner is fixed, smaller than the storage modulus (G"t) of the toner and thus having great elastic force. That is, the required smoothness is not realized by fusion and deformation of the toner when the fixing process is performed. In the present invention, toner is embedded in the image receiving layer to smooth the surface. Since the toner particles are not considerably deformed, small dots and hair lines are not deformed. Thus, a sharp and dense image can be obtained.

In the present invention, the loss modulus (G") of the image receiving layer is, at the temperatures at which said toner is fixed, smaller than the loss modulus (G"t) of the toner. To smooth the surface by embedding gaps between toner particles with the image receiving layer when fixing is performed, both of the elasticity and the viscosity are important factors. If air is left in the gap between the toner particles, irregular deflection takes place due to air bubbles and change of the refractivity when viewed with transmissive light of an OHP sheet or the like. Thus, required saturation and brightness cannot be obtained. To prevent great deformation of toner particles, gaps must be plugged by using fusing deformation of the image receiving layer. Thus, use of an image receiving layer having a loss modulus which is smaller than that of the toner is an effective means.

In the present invention, the loss tangent (G"/G') of the image receiving layer and that of the toner have at least one peak value and Ts<Tt is satisfied when the lowest temperatures at which the image receiving layer and the toner have the peak values are Ts and Tt. As described above, the point at which the loss tangent has a peak value is the toner at which the main characteristics of the resin is shifted from elasticity to the viscosity. To prevent deformation of the toner particle, the image receiving layer must be melted and deformed prior to starting of the deformation of the toner particle. That is, the toner at which the peak is attained must satisfy Ts<Tt.

Further, the image forming apparatus for forming a high quality image must realize adequate matching with the image receiving sheet in the fixing process. Since the image receiving sheet has the image receiving layer made of the thermoplastic resin having a specific thermal characteristic, the fixing means must be designed in consideration of the winding of the image receiving sheet and conveyance easiness. In consideration of the above-mentioned factors, optimum conditions for the fixing means are determined.

The image forming apparatus according to the present invention has the structure such that the image receiving sheet comprises the image receiving layer having the storage modulus (G') of $1\times10^2$ Pa to $1\times10^5$ Pa and the loss modulus (G") of $1\times10^2$ Pa to $1\times10^5$ Pa. Moreover, assuming that the pressure of the press contact portion of the fixing means for allowing the image receiving sheet to pass through is P kgf/cm$^2$, relationship 1 kgf/cm$^2$≦P≦20 kgf/cm$^2$is satisfied. If the pressure is lower than 1 kgf/cm$^2$ when toner is fixed to the image receiving layer, the pressing force is too weak to strongly fix the toner to the image receiving layer. In this case, the image is separated due to rubbing of the surface or the like. If the pressure exceeds 20 kgf/cm$^2$, the image receiving sheet is unintentionally wound around the press contact member.

Assuming that the length of the press contact portion in the direction in which the image receiving sheet is conveyed is L mm, the image forming apparatus according to the present invention is structured to satisfy 0.5 mm≦L≦10 mm. The press contact portion heats and pressurizes the image receiving sheet to fix the toner to the softened image receiving layer. At this time, the press contact portion is arranged to have pressure distribution.

As a result of the investigation in the present invention, the pressure distribution is an important factor. To realize a smooth surface of the image, it is effective to forcibly and quickly push the toner under a high pressure after the image receiving layer has been softened with somewhat heat in the press contact portion. That is, if the length of the press contact portion is shorter than 0.5 mm, sharp pressure distribution is realized. In this case, toner is pushed unintentionally before the image receiving layer is sufficiently softened. As a result, if the length of the press contact portion is less than 0.5 mm, toner is pushed back to the image receiving layer after toner has passed through the press contact portion. Therefore, satisfactory surface smoothness cannot be obtained. If the length exceeds 10 mm, broad pressure distribution is realized. As a result, the toner cannot strongly be pushed into the image receiving layer. If the pressure is raised, winding of the image receiving sheet unintentionally takes place.

Assuming that the length of the press contact portion in the direction in which the image receiving sheet is conveyed is L mm and the pressure of the press contact portion is P $kgf/cm^2$, relationship $0.5\ P \leqq L \leqq 0.5\ P+4$ is satisfied. If the relationship of the pressure and the length of the press contact portion satisfied the above-mentioned requirement, small dots and hair lines are not deformed. Thus, a higher quality image can be obtained and winding and curl of the image receiving sheet can be prevented.

The image forming apparatus according to the present invention has a structure such that the average interval (Sm) of crests of the member of the press contact portion which is brought into contact with the image receiving layer is 20 μm or longer. The average interval (Sm) of the crests is an average value of intervals of concave portions and convex portions of cross sectional curves indicating the surface roughness within a reference length. If the average interval of the crests of the member of the press contact portion is 20 μm or longer, sufficiently high pressure is applied even if an aggregation of toner particles forming each dot is introduced into a concave portion in the surface of the press contact portion when toner is pressed. As a result, uniform smoothness can be obtained. It is preferable that the average interval is larger than the minimum diameter of the dot required to realize a required image quality.

The image forming apparatus according to the present invention is structured such that the following relationship is satisfied when the average roughness (Ra) on the center line which is the roughness of the surface of the member of the press contact portion which is brought into contact with the image receiving layer is r μm and the average interval (Sm) of crests of the member and the average particle size of the toner is d μm: $sr \leqq 2d$. If air is unintentionally introduced when toner is pressed against the image receiving layer by the press contact portion when fixing is performed, air bubbles are formed. Thus, the image is affected excessively with transmissive light. Therefore, provision of somewhat surface roughness is an effective means as a relieving portion for air in the press contact portion. However, if the foregoing range is not satisfied, the smoothness which is realized after fixing has been performed is affected adversely. The surface roughness is the average interval (Sm) of crests and center line average roughness (Ra) defined in JIS-B-0601 and is a value measured by a known tracer type surface roughness meter.

The various physical property values employed in the present invention are value measured by the following methods. And referring to examples and comparative examples, the present invention will be described further in detail. Note that the present invention is not limited to the following description.

(1) With respect to the distribution of the molecular weight:

Molecular Weight

An apparatus structured such that a column is attached to gel permeation chromatography (GPC) measuring apparatus was used at temperature of 20° C. and a flow rate of 1 material/minute. It is preferable that the column for use in the measurement be formed by combining a plurality of marketing polystyrene gel columns. For example, it is preferable that combination of μ-styragel 500, 103, 104 and 105 manufactured by Water Co., combination of shodex KF-80M, KF-801, 803, 804 and 805 manufactured by Showa Denko K.K., combination of KA-802, 803, 804 and 805 or combination of TSKgel G1000H, G2000H, G25000H, G3000H, G4000H, G5000H, G6000H, G7000H and GMH manufactured by Tosoh Corporation be employed. Samples to be measured were dissolved in tetrahydrofuran (THF) at a concentration of 0.2 wt %, and then filtered by a 0.45 μm-filter. The distribution of the molecular weight of the sample was measured such that measuring conditions were selected in such a manner that the molecular weight of the sample was included in a range in which the logarithm of the molecular weight of analytical curves processed by a variety of monodisperse reference samples and counts formed straight lines.

Insoluble Matter of THF

Resin in a quantity of 0.5 g is stirred for about 30 hours so as to be dissolved in a state where the resin is enclosed hermetically in a container in which THF solution is, by about 100 ml is enclosed. Then, the insoluble matter is removed by filtration from the THF solution, followed by being vacuum-dried at 100° C. for about 90 minutes. Then, the sample was weighed to obtain the weight ratio of the insoluble resins in the THF.

Acid Value

The acid value of the resin for use in the image receiving layer is measured by a method conforming to JISK-0070.

To compensate the saturation, image density and luster of a color image with the image receiving sheet, the surface of the image must be made smooth and an image receiving layer having a low softening point must be used. However, the image receiving layer having a low softening point arises a problem of offset of the toner and the image receiving layer to the fixing roller when the fixing process is performed. Therefore, the resin for use in the image receiving layer must have smoothness and offset resistance which are antithetic characteristics. That is, since a portion which is fused at a relative low temperature and a portion capable of maintaining the coagulation force even at high temperatures are required, it can be considered that resin in the image receiving layer having distribution of the molecular weight which has a low molecular weight portion and a high molecular weight portion is advantageous.

Figure 5:
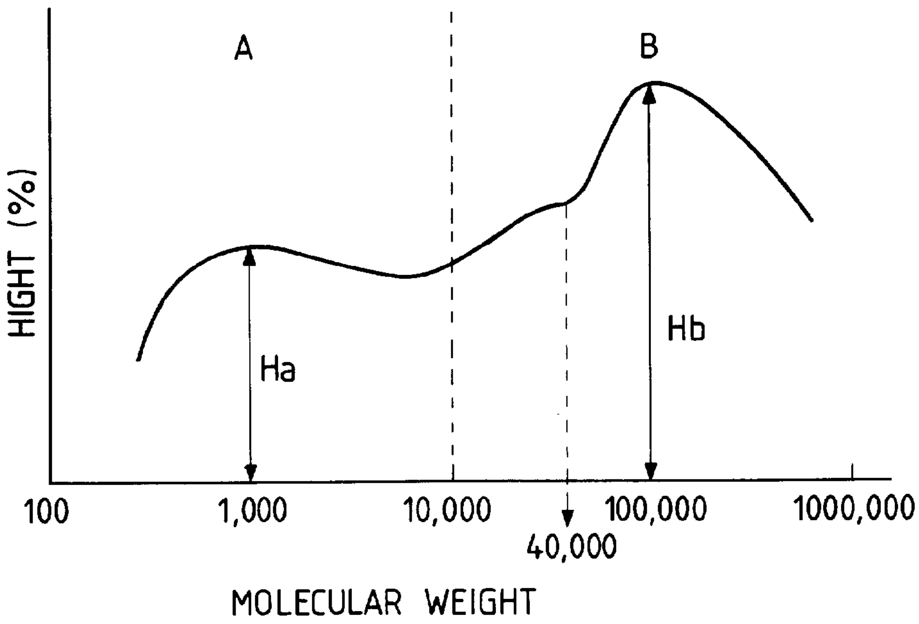
FIG. 5 shows a graph showing distribution of molecular weight of the resin according to the present invention measured by GPC.

When the distribution of the molecular weight of the resin is measured by the GPC measurement method, a curve as shown in FIG. 5 is generally measured. For example, the curve shown in FIG. 5 has peaks 1,000 and 100,000 and a shoulder 40,000. That is, the total number of the peaks and the shoulders is not smaller than two. In the graph showing the distribution of the molecular weight shown in FIG. 5, axis of abscissa stands for the molecular weight and axis of ordinate stands for the intensities detected by a differential refractometer.

The molecular weight component (region A) in the region in which the molecular weight is less than 10,000 is mainly an effective component for embedding toner into the image receiving layer. The component (region B) in the region of 10,000 or more has a coagulation force even when thermal fusion is performed and has an effect to prevent offset. Therefore, the foregoing structure realizes an image receiving sheet having excellent effect to embed toner and preventing offset.

The insoluble matter of THF is considered to be gel components of the resin generated due to crosslinking. The foregoing insoluble matter causes the coagulation force of the image receiving layer to be strengthened. Thus, offset resistance and the blocking resistance can furthermore be improved. If the insoluble matter exceeds 40 wt %, the coagulation force of the image receiving layer becomes too strong. When it is applied to the base sheet, the film forming characteristic deteriorates and thus a problem arises in manufacturing. It is furthermore preferable that the insoluble matter of THF be 20 wt % or less.

If the resin has an acid value greater than 100 mgKOH/g, water can easily be adsorbed by the surface of the image receiving layer. Therefore, the image receiving layer can easily be affected by the environment if the temperature and humidity are high or those are low. In this case, a tendency is detected that the image deteriorates. What is worse, the crosslinking reactions proceed after it has been applied to the base sheet, in particular, when the drying process is performed. Therefore, a problem similar to that in the description of the insoluble matter of THF arises. It is further preferable that the acid value be 50 mgKOH/g or lower.

The reason why the heights Ha and Hb of the maximum peaks (or shoulders) in the low molecular weight portion and the high molecular weight portion are specified as shown in FIG. 5 is that embedding of toner and improvement in the offset resistance must be balanced in principle. If Ha/Hb is less than 0.2, toner cannot satisfactorily be embedded and realized surface smoothness after fixing has been performed is unsatisfactory. If Ha/Hb is larger than 5, the offset resistance deteriorates. Therefore, a preferred range is 0.25 to 4.

Next, examples and comparative examples of which the aforementioned physical properties were measured will be described.

EXAMPLE 1-1

A transparent polyethylene terephthalate (PET) film (having a thickness of 100 $\mu$m) was employed as the base sheet. On the base sheet, coating solution for the image receiving layer having the following composition was applied by using a bar coater in such a manner that the dry thickness is 10 $\mu$m to 15 $\mu$m so that an image receiving sheet was obtained. The enlarged cross sectional view showing an essential portion corresponds to FIG. 1(*a*)

| Coating Solution 1 | |
|---|---|
| polyester resin | 30 parts |
| distribution of molecular weight: | peak 100,000, shoulder 50,000 |
| insoluble matter of THF: | 18% |
| Acid Value: | 51 mg KOH/g |
| Ha/Hb: | 0.32 |
| methylethylketone:toluene = 1:1 | 70 parts |

EXAMPLE 1-2

Similarly to Example 1-1, the following coating solution 2 for the image receiving layer was applied to the base so that an image receiving sheet according to Example 1-2 was manufactured. The enlarged cross sectional view corresponds to FIG. 1(*a*).

| Coating Solution 2 | |
|---|---|
| polyester resin | 30 parts |
| distribution of molecular weight: peak | 70,000, 2,000 |
| insoluble matter of THF | 8% |
| Acid Value | 35 mgKOH/g |
| Ha/Hb | 0.45 |
| methylethylketone:toluene = 1:1 | 70 parts |

Then, a toner image was formed on each of the thus-obtained image receiving sheets according to Examples 1-1 and 1-2 by a known electrophotographic method. Then, each of the image receiving sheets having the formed toner images was allowed to pass through a heat roller fixing apparatus so a to be subjected to heating and pressing process. Note that the toner contains polyester resin as the binder thereof and formed into particles colored by pigment.

The offset resistance and surface smoothness of the obtained images were evaluated. The offset of the image was evaluated such that samples having no offset in the image portion were evaluated to be O, samples having partial offset were evaluated to be Δ, and samples having offset were evaluated to be x. Since the surface smoothness is greatly reflected on the transparency, a haze meter (NDH-1001DP manufactured by NIPPON DENSYOKU KOGYO Co., LTD.) was used to measure the haze of a solid image. Results of evaluation of the obtained images were shown in Table 1.

[TABLE 1]

| | Offset Resistance | Haze |
|---|---|---|
| Example 1-1 | O | 30% |
| Example 1-2 | O | 20% |

As shown in Table 1, the image receiving sheets according to Examples 1-1 and 1-2 had excellent offset resistance and transparency as compared with the following Comparative Example 1-1. The resin according to Example 1-2 enables the toner to be deeply embedded in the image receiving layer. Thus, the surface smoothness can be improved and an image having excellent transparency can be obtained.

Comparative Example 1-1

In Comparative Example 1-1, experimental resin having distribution of the molecular weight which had no shoulder or the like and which had one peak was employed to form the image receiving sheet in comparison to Examples 1-1 and 1-2. The following coating solutions 3 and 4 for the image receiving layers for forming the image receiving sheets according to Comparative Example 1-1 were used to evaluate the offset resistance of the image and haze. Results were shown in Table 2.

| | |
|---|---|
| Coating Solution 3 | |
| polyester resin | 30 parts |
| distribution of molecular weight: | peak 70,000 |
| insoluble matter of THF: | 22% |
| Acid Value: | 40 mg KOH/g |
| methylethylketone:toluene = 1:1 | 70 parts |
| Coating Solution 4 | |
| polyester resin | 30 parts |
| distribution of molecular weight: | peak 5,000 |
| insoluble matter of THF: | 15% |
| Acid Value: | 38 mg KOH/g |
| methylethylketone:toluene = 1:1 | 70 parts |

[TABLE 2]

| | Offset Resistance | Haze |
|---|---|---|
| Comparative Example (coating solution 3) | O | 60% |
| Comparative Example (coating solution 4) | X | X |

If the resin having the distribution of the molecular weight which has no shoulder or the like and which has one peak is used to form the image receiving layer, the realized transparency, that is, embedding of toner, is unsatisfactory though satisfactory offset resistance can be obtained in a case of the image receiving sheet manufactured by, for example the coating solution 3. Therefore, a high haze value is realized. If resin having a low molecular weight is employed to embed the toner, offset takes place. The haze of the image receiving sheet of the comparative example (coating solution 4) was evaluated to be example because of image offset and right evaluation could not be performed.

EXAMPLE 1-3

The following resins A to E respectively containing insoluble matters of THF by 10%, 20%, 30%, 40% and 50% were employed as the resins for the image receiving layers so as to be applied to the base, similarly to Example 1-1 so that image receiving sheets according to Example 1-3 were manufactured. The offset resistance and haze of the images on the obtained image receiving sheets were evaluated, similarly to Example 1-1. Results were shown in Table 3. The enlarged cross sectional view corresponds to FIG. 1(*a*).

| | |
|---|---|
| Polyester Resin A | |
| Distribution of Molecular Weight: | peak 70,000, shoulder 2,000 |
| Insoluble Matter of THF: | 10% |
| Acid Value: | 48 mg KOH/g |
| Ha/Hb: | 0.55 |
| Polyester Resin B | |
| Distribution of Molecular Weight: | peak 80,000, peak 2,000 |
| Insoluble Matter of THF: | 20% |
| Acid Value: | 40 mg KOH/g |
| Ha/Hb: | 0.63 |
| Polyester Resin C | |
| Distribution of Molecular Weight: | peak 95,000, peak 5,000 |

-continued

| | |
|---|---|
| Insoluble Matter of THF: | 30% |
| Acid Value: | 36 mg KOH/g |
| Ha/Hb: | 0.37 |
| Polyester Resin D | |
| Distribution of Molecular Weight: | shoulder 110,000, peak 8,000 |
| Insoluble Matter of THF: | 40% |
| Acid Value: | 29 mg KOH/g |
| Ha/Hb: | 1.98 |
| Polyester Resin E | |
| Distribution of Molecular Weight: | peak 150,000, peak 8,000 |
| Insoluble Matter of THF: | 50% |
| Acid Value: | 27 mg KOH/g |
| Ha/Hb: | 1.58 |

[TABLE 3]

| Insoluble Matter of THF | Offset Resistance | Haze |
|---|---|---|
| 10% | O | 20% |
| 20% | O | 25% |
| 30% | O | 30% |
| 40% | O | 40% |
| 50% | O | 60% |

If the insoluble matter of THF exceeds 40% as shown in Table 3, the viscoelasticity of the image receiving layer is not lowered when fixing is performed. Thus, toner cannot sufficiently be embedded and thus the haze cannot be lowered. To lower the haze, it is preferable that the insoluble matter of THF be 20% or lower.

EXAMPLE 1-4

The following resins F to I respectively having acid values of 50, 75, 100 and 125 mgKOH/g were employed as the resins for the image receiving layers so as to be applied to the base, similarly to Example 1-1 so that image receiving sheets according to Example 1-1 were manufactured. The obtained image receiving sheets were used to form toner images by the known electrophotographic method under high temperature and high humidity condition (35° C./65% RH). The quality of each of the formed images was evaluated. The quality of the images were evaluated to be O, Δ and X such that disorder such as dispersion and lacking of the transferred image was evaluated.

| | |
|---|---|
| Polyester Resin F | |
| Distribution of Molecular Weight: | shoulder 70,000, peak 2,000 |
| Insoluble Matter of THF: | 13% |
| Acid Value: | 50 mg KOH/g |
| Ha/Hb: | 1.58 |
| Polyester Resin G | |
| Distribution of Molecular Weight: | peak 70,000, shoulder 5,000 |
| Insoluble Matter of THF: | 15% |
| Acid Value: | 75 mg KOH/g |
| Ha/Hb: | 0.83 |
| Polyester Resin H | |
| Distribution of Molecular Weight: | peak 65,000, shoulder 5,000 |

-continued

| | |
|---|---|
| Insoluble Matter of THF: | 22% |
| Acid Value: | 100 mg KOH/g |
| Ha/Hb: | 0.71 |
| Polyester Resin I | |
| Distribution of Molecular Weight: | peak 50,000, peak 4,000 |
| Insoluble Matter of THF: | 12% |
| Acid Value: | 125 mg KOH/g |
| Ha/Hb: | 1.41 |

[TABLE 4]

| Acid Value | Evaluated Quality of Image |
|---|---|
| 50 | O |
| 75 | Δ |
| 100 | Δ |
| 125 | X |

As shown in Table 4, if the acid value exceeds 100 mgKOH/g, the surface characteristic, such as the resistance, is changed due to moisture absorption of the resin in the image receiving layer when the toner and humidity are high. This leads to disorder of the transferred image. It is furthermore preferable that the acid value be 50 mgKOH/g or lower.

EXAMPLE 1-5

Resins J to O having the following ratio Ha/Hb were employed as the resin for the image receiving layer when the height of the maximum peak or shoulder in region A in which the molecular weight is less than 10,000 in the distribution of the molecular weight measured by GPC is Haze and the height of the maximum peak or shoulder in region Brightness in which the molecular weight is 10,000 or more. The resin was applied to the base, similarly to Example 1-1 so that the image receiving sheets according to Example 1-5 were manufactured. The offset resistance and haze of the images formed on the obtained image receiving sheets were evaluated similarly to Example 1-1. Results were shown in Table 5. The enlarged cross sectional view corresponds to FIG. 1(*a*).

| | |
|---|---|
| Polyester Resin J | |
| Distribution of Molecular Weight: | peak 110,000, peak 8,000 |
| Insoluble Matter of THF: | 13% |
| Acid Value: | 27 mg KOH/g |
| Ha/Hb: | 0.1 |
| Polyester Resin K | |
| Distribution of Molecular Weight: | peak 65,000, shoulder 8,000 |
| Insoluble Matter of THF: | 10% |
| Acid Value: | 28 mg KOH/g |
| Ha/Hb: | 0.2 |
| Polyester Resin L | |
| Distribution of Molecular Weight: | peak 25,000, shoulder 5,000 |
| Insoluble Matter of THF: | 16% |
| Acid Value: | 34 mg KOH/g |
| Ha/Hb: | 0.25 |

-continued

| | |
|---|---|
| Polyester Resin M | |
| Distribution of Molecular Weight: | peak 70,000, peak 7,000 |
| Insoluble Matter of THF: | 19% |
| Acid Value: | 35 mg KOH/g |
| Ha/Hb: | 4 |
| Polyester Resin N | |
| Distribution of Molecular Weight: | peak 81,000, peak 7,000 |
| Insoluble Matter of THF: | 11% |
| Acid Value: | 24 mg KOH/g |
| Ha/Hb: | 5 |
| Polyester Resin O | |
| Distribution of Molecular Weight: | peak 81,000, peak 7,000 |
| Insoluble Matter of THF: | 19% |
| Acid Value: | 44 mg KOH/g |
| Ha/Hb: | 10 |

[TABLE 5]

| Ha/Hb | Offset Resistance | Haze |
|---|---|---|
| 0.1 | O | 60% |
| 0.2 | O | 30% |
| 0.25 | O | 20% |
| 4 | O | 20% |
| 5 | Δ | 15% |
| 10 | X | X |

As shown in Table 5, if the Ha/Hb is included in the range from 0.2 to 5, both of the offset resistance and haze can be improved. If it is 0.25 to 4, an image receiving sheet having balanced offset resistance and surface smoothness can be obtained.

EXAMPLE 1-6

The following resins P and Q for forming the image receiving layers and having different molecular weight distributions were used as coating solutions so that the lower layers were formed and then the upper layers were formed. Thus, the image receiving sheets having two layer structure according to Example 1-6 were manufactured. The offset resistance and haze of the image on the obtained image receiving sheet were evaluated similarly to Example 1-1. Results are shown in Table 6. The enlarged cross sectional view showing the essential portion corresponds to FIG. 1(*b*).

| | |
|---|---|
| Polyester Resin P | |
| Distribution of Molecular Weight: | peak 3,000 |
| Insoluble Matter of THF: | 2% |
| Acid Value: | 11 mg KOH/g |
| Polyester Resin Q | |
| Distribution of Molecular Weight: | peak 70,000 |
| Insoluble Matter of THF: | 13% |
| Acid Value: | 27 mg KOH/g |

[TABLE 6]

| Upper Layer | Lower Layer | Ha/Hb | Offset Resistance | Haze |
|---|---|---|---|---|
| Resin Q | Resin P | 1.5 | O | 30% |
| Resin P | Resin Q | 1.3 | Δ | 20% |

If the resin Q having high molecular weight is employed to form the upper layer as shown in Table 6, excellent offset resistance can be obtained. If the resin P having low molecular weight component is employed to form the upper layer, advantage can be obtained when toner is embedded. Thus, an image having excellent surface smoothness can be obtained.

(2) With respect to the critical surface tension of the image receiving layer and the external additive:

Critical Surface Tension

The critical surface tension γc can be obtained by a known measuring method. Specifically, it can be obtained by Dismann plot. That is, contact angles θ with respect to a plurality fluids are measured, COS θ is plotted with respect to the surface tension of the respective fluids. Then, a value at which the straight lines satisfies COS θ=1 is defined to be the critical surface tension γc. The measurement of the contact angle and the Dismann plot can be measured by an automatic contact angle meter manufactured by KYOWA KAIMEN KAGAKU Co. In this embodiment, when the external additive is measured, the external additive is pulverized by a tablet machine manufactured by SHIMADZU CORPORATION to obtain a pellet having an outer diameter of 11 mm which is used as the sample to be measured. The pellet of the external additive is required such that the surface to be measured has surface smoothness and satisfactory strength to prevent deformation when the pellet is conveyed or measured to satisfactorily measure the contact angle. In this embodiment, pellet molding load is set to be one ton and the molding time is set to be three minutes.

The thickness of the image receiving layer may be measured such that the cross section of the image receiving sheet is observed by an optical micrometer or an electronic microscope. As an alternative to this, the difference between the thickness of the image receiving sheet and that of the base is used to calculate the thickness.

Refractivity

The refractivity of the external additive is measured by a digital refractivity meter manufactured by ATAGO Co. The sample to be measured is similar to that with which the critical surface tension is measured. That is, the tablet molding machine is used to pulverize the external additive to form the same into pellet. The sample of the resin of the image receiving layer of the image receiving sheet is obtained by mechanically or chemically separating the image receiving layer formed on the base. As a matter of course, the measuring methods are not limited to the foregoing methods. The resin in the image receiving layer retained on the base may be measured.

Solubility Parameter

The solubility parameter of the resin in the image receiving layer or the releasing agent in the toner can be obtained by a known measuring method. As an alternative to this, available data obtainable from known documents may be employed.

Softening Point of the Toner

The softening point (Tm) of the toner is measured by a flow tester manufactured by SHIMADZU CORPORATION under conditions that the load is 20 kg, orifice having size 1 mm×1 mm in diameter and temperature raising rate is 6° C./minute. Under the foregoing conditions, temperature at which ½ discharge is defined to be the softening point Tm.

Molecular Weight

The weight average molecular weight (Mw) and the number average molecular weight (Mn) of the binding resin in the toner can be obtained by obtaining the distribution of the molecular weight such that the resin in the toner is dissolved in a solvent and the soluble matter is measured by gel permeation chromatography (GPC) as described in the above (1).

Haze

The transparency of the fixed image is measured as haze by using a haze meter NDH-1001DP manufactured by NIPPON DENSYOKU KOGYO Co., LTD. as described in (1) such that a fixed solid image formed by monochrome toner is measured. In this embodiment, magenta toner is used unless otherwise specified and measurement is performed such that a so-called solid image having a toner layer formed densely over the surface of the image region on the image receiving sheet is evaluated. A sample to be measured is a solid image adjusted such that the quantity of non-fixed toner on the image receiving sheet is 0.4 $mg/cm^2$ or more and the density of the fixed image is 1.0 or higher. Note that images excessively wanting of a portion thereof caused from adhesion (so-called offset) of toner to the fixing means when fixing has been performed, images excessively wanting (deletion) attributable of unsatisfactory transference when transference is performed, images which cannot be measured due to generation of winding of the image receiving sheet around the fixing means and those having haze exceeding 40% are evaluated to be X. Images having the haze not greater than 40% are evaluated to be Δ. Namely, images of the foregoing type which is formed into a projected image by using a light transmissive overhead projector and involving black tone are evaluated to be practical such that the images are used to form a so-called business graph composed of a multi-color image having no halftone portion, for example, only cyan, magenta, yellow, red, blue and green each of which has substantially reached the saturated image density. Images having haze of 30% or lower is evaluated to be O, that is, the images are evaluated to be practical as a multi-color image including halftone portion, which is a so-called a full color image. Images having haze of 20% or lower are evaluated to be ◎. That is, an evaluation is made that the image can be used as a full color image because no color fogging exists.

EXAMPLE 2-1

This example relates to the critical surface tension of the image receiving layer of the image receiving sheet of the image forming apparatus according to the present invention and the toner.

As the toner, polyester resin is used as the binding resin. A kneading and pulverizing method is employed to use monothilic toner having a number average particle size of 6 μm. The softening point (Tm) of the toner is 125° C. and the ratio (Mw/Mn) of the weight average molecular weight (Mw) and the number average molecular weight (Mn) of the binding resin in the toner is 105. Note that was which is the releasing agent is not added.

As the external additive for the toner, silica particles having a primary particle size of 14 nm is subjected to surface treatment using hexamethylenedisilanzane. The obtained material is added by 2 wt %. The critical surface tension of the external additive is 35 dyn/cm and the refractivity of the external additive is 1.458.

The image receiving layer of the image receiving sheet according to this embodiment is a resin layer containing polyester resin similar to the binding resin in the toner by at least 50 wt %. The composition of the polyester resin, in particular, the functional group of the terminative molecule chain and distribution of the molecular weight are adjusted. Moreover, a variety of resins, such as fluororesin, for example, polytetrafluoroethylene, or alcohol resin, such as polyvinylbutyral are added in a quantity which does not exceed 50 wt %. Thus, the critical surface tension of the image receiving layer is adjusted. Note that the difference between the refractivity of the external additive for the toner and that of the resin in the image receiving layer is adjusted to be about 0.05.

The thickness of the image receiving layer is made to be about 6 μm.

In this embodiment, the transparency (haze) of image receiving sheets including image receiving layers, to each of which the toner is fixed, and which have different critical surface tensions, were evaluated. Results are shown in Table 7.

[TABLE 7]

| Critical Surface Tension (dyn/cm) | Haze |
|---|---|
| 40 | X |
| 38 | X |
| 35 | Δ |
| 30 | O |
| 25 | ⊚ |
| 20 | ⊚ |

Note that the foregoing image receiving sheets were cut by a diamond cutter to observe their cross sections. As a result, the image receiving sheets respectively having the critical surface tensions of 38 and 40 had small air bubbles and an interface formed around the toner, in particular the external additive on the surface of the toner.

As can be understood from the foregoing results, satisfactory transparency can be obtained by making the critical surface tension of the image receiving layer to be smaller than the critical surface tension of the external additive.

Even if the external additive on the surface of the toner is added in a large quantity to cover the overall surface of the toner particles, satisfactory wettability of the external additive with respect to the resin in the image receiving layer is able to prevent generation of an interface attributable to the external additive. Thus, irregular reflection of light on the interface can be prevented and thus the color development characteristic and the transparency can be improved.

When the toner is embedded in the image receiving layer, the contact area between the toner and the image receiving layer is enlarged. In a case where the melting viscosity of the image receiving layer is sufficiently lower than the melting viscosity of the toner and embedding is performed such that the graininess and shape of the toner are substantially retained, resin in the image receiving layer is introduced into the gap between toner particles. Therefore, the contact area between the toner and the image receiving layer is further enlarged. Therefore, the state of the surface of the toner, in particular, the wettability of the same affects. In particular, the wettability of the external additive affects. Therefore, even if the external additive on the surface of the toner is added in a large quantity to cover the overall surface of the toner, satisfactory color development characteristic and transparency can be obtained.

EXAMPLE 2-2

This example relates to the refractivity of the image receiving layer of the image receiving sheet of the image forming apparatus according to the present invention and that of the toner.

The specific structure of this example is similar to that of Example 2-1 except for the image receiving layer to which the toner is fixed.

Results of this example are shown in Table 8.

[TABLE 8]

| Critical Surface Tension | Difference in Refractivity | | | |
|---|---|---|---|---|
| (dyn/cm) | 0.01 | 0.03 | 0.05 | 0.07 |
| 35 | O | O | Δ | Δ |
| 30 | O | O | O | Δ |
| 25 | ⊚ | ⊚ | ⊚ | O |
| 20 | ⊚ | ⊚ | ⊚ | O |

As can be understood from the above-mentioned results, if the difference in the refractivity exceeds 0.05, the transparency deteriorates. Therefore, by making the difference in the refractivity to be 0.05 or less, an image having further improved transparency and color development characteristic can be formed. In this embodiment, the refractivity of the image receiving layer to which the toner is fixed is changed. Satisfactory transparency can be obtained by using an external additive different from that employed in Example 2-1 and by making the difference in the refractivity to be 0.05 or less, more preferably 0.03 or less.

EXAMPLE 2-3

This embodiment relates to the solubility parameter of the resin image receiving layer to be applied to the image forming apparatus according to the present invention and to which toner is fixed and the solubility parameter of the releasing agent forming the toner.

The structure of this example is similar to that of Example 2-1 except for the structure in which toner containing the releasing agent further added into the resin in the toner is employed and resin having various solubility parameter is used as the resin of the image receiving layer. The releasing agent is polypropylene wax or polyethylene wax.

Samples having different differences (absolute values) of the solubility parameter between the releasing agent and the resin in the image receiving layer were manufactured. Results evaluation of the transparency are shown in Table 9.

[TABLE 9]

| Critical Surface Tension | Difference in Solubility Parameter ΔSp | | | |
|---|---|---|---|---|
| (dyn/cm) | 0.5 | 1.4 | 2.0 | 2.5 |
| 35 | Δ | Δ | Δ | Δ |
| 30 | O | O | O | Δ |

Note that the foregoing image receiving sheets were cut by a diamond cutter to observe their cross sections. As a result, the image receiving sheet having the solubility parameter ΔSp of 2.5 had small air bubbles and an interface in the toner, in particular, on the surface of the toner.

As can be understood from the foregoing results, satisfactory transparency can be obtained by making the difference between the solubility parameter of the image receiving layer and that of the releasing agent to be 2 or smaller.

The reason for this will be described. In a case where the releasing agent is employed as a component of the toner, the releasing agent is eluted to the surface of the toner when the toner is fixed because the releasing agent has a considerably low viscosity when it is melted as compared with the binding resin in the toner. Therefore, the re leasing agent is distributed eccentrically. Therefore, an interface is generated between the toner and the resin layer and thus the transparency deteriorates. Accordingly, the affinity or the compatibility between the releasing agent and the image receiving layer is improved to make the solubility parameters of the releasing agent and the image receiving layer to approximate. Thus, generation of an interface attributable to the releasing agent is prevented. As a result, irregular reflection of light on the interface can be prevented and thus the color development characteristic and the transparency can be improved.

To reduce the size and cost of the image forming apparatus and to realize maintenance free structure, a suggestion has been performed in which the quantity of the releasing agent to be contained in the toner is enlarged. For example, the releasing agent is added to the binding resin by 5 wt % to 30 wt % in order to prevent offset of the fixing means to the toner even if an offset preventive agent, such as silicon oil is not applied to the fixing means, in particular, to the surface of the heat roller. The structure of this example is considerably effective in this case in which the quantity of the releasing agent is enlarged.

EXAMPLE 2-4

This example relates to the relationship between the critical surface tension of the releasing agent and that of the external additive in the toner in the image forming apparatus according to the present invention.

The specific structure of this example is similar to that of Example 2-3 except for the critical surface tension of the releasing agent.

Results of this example are shown in Table 10.

[TABLE 10]

| Releasing Agent Critical Surface Tension (dyn/cm) | Haze |
|---|---|
| 40 | X |
| 35 | Δ |
| 30 | O |
| 25 | ⊚ |

As can be understood from the foregoing results, satisfactory transparency can be obtained when the critical surface tension of the releasing agent of the toner is made to be lower than the critical surface tension of the external additive.

EXAMPLE 2-5

This example relates to the external additive for the toner for use in the image forming apparatus according to the present invention.

The specific structure of this example is similar to that of Example 2-1 except for the external additive. The external additive according to this example is arranged such that two types are employed in addition to the external additive according to Example 2-1, such that external additive having a large particle size is furthermore employed. The external additive having the large particle size is obtained by subjecting the surfaces of silica particles having a primary particle size of 40 nm to a hydrophobic process using hexamethylenedisilanzane. The obtained material is added by 0.7 wt %. The critical surface tension of the external additive containing the two types of the materials is 35 dyn/cm.

Results of this example are shown in Table 11.

[TABLE 11]

| Critical Surface Tension (dyn/cm) | Haze |
|---|---|
| 40 | X |
| 38 | X |
| 35 | Δ |
| 30 | O |
| 25 | ⊚ |
| 20 | ⊚ |

As can be understood from the foregoing results, satisfactory color development characteristic can be obtained similarly to Example 2-1 even if external additive consisting of two or more types of external additive having different particle sizes.

As can be understood from the foregoing results, satisfactory transparency can be obtained when the softening point (Tm) of the toner is 110° C. or higher and 140° C. or lower.

(3) With respect to the viscoelasticity of resin:

Measurement of Viscoelasticity of Resin in Image Receiving Layer and Toner

Viscoelasticity Measuring Apparatus: rheometer RDA-II (manufactured by Reometrix Co.)

Measuring Jig: a parallel plate having a diameter of 7.9 mm is used when the elastic modulus is high and that having a diameter of 25 mm is used when the elastic modulus is low.

Sample to be Measured: the resin in the image receiving layer or toner is heated and melted, and then molded into cylindrical samples each having a diameter of about 8 mm and a height of 2 mm to 5 mm or disc-like samples each having a diameter of about 25 mm and a thickness of 2 mm to 3 mm.

Measuring Frequency: 6.28 radian/second

Setting of Measurement Distortion: the initial value is et to 0.1% and an automatic measurement mode is employed to perform the measurement.

Correction of Sample Elongation is Adjusted: by an automatic measurement mode.

Temperature at which Measurement is Performed: temperature is raised from 25° C. to 180° C. at a rate of 1° C./minute.

Measurement of Transparency (Haze) of Fixed Image

As similar to (1) and (2), the haze meter (NDH-1001DP manufactured by NIPPON DENSYOKU KOGYO Co., LTD.) was used to evaluate that of a fixed solid magenta image (the amount of toner allowed to adhere the sheet is 0.5 $mg/cm^2$ or more). Samples encountered excessive lacking of the image due to offset and those which could not be measured attributable to winding of the sheet were evaluated to be x.

Evaluation of Offset Resistance

The offset resistance of the image receiving sheet, that is, the degree of difficulty for the image receiving layer of the image receiving sheet to be allowed to adhere to the fixing means is evaluated as follows.

Initially, image receiving sheets respectively having images formed by non-fixed toner in different quantities are supplied to the fixing means to fix each image. At this time, the fixing means (specifically, the surface of the heating means) is visually observed to determine whether or not the image receiving layer of the image receiving sheet has been shifted. Thus, the evaluation is performed in accordance with the amount of the non-fixed toner allowed to adhere to the image realized when shift of the image receiving layer to the fixing means has been observed. Note that the amount of the non-fixed toner allowed to adhere to the image can be adjusted by controlling the exposing energy which is used when a latent image is formed or voltage to be applied to the developing means or the transfer means. The toner image is, in this evaluation, formed such that it is allowed to uniformly adhere to substantially the overall surface of the image receiving sheet.

The state of generation of the offset is evaluated with the following five grades.

Level 5: no generation (no offset of the image receiving layer is observed when an image of the toner, the quantity of which is 0.1 $mg/cm^2$ or smaller, is formed. A satisfactory full color image can be formed which has highlight portions, the transparency of which is free from deterioration).

Level 4: Slight (offset of the image receiving layer is observed when an image of the toner, the quantity of which is larger than 0.1 $mg/cm^2$, is formed. Although the transparency deteriorates in the highlight portion, a practical full color image can be formed which can be used even as an OHP image if the base of the image receiving sheet is transparent).

Level 3: Small (offset of the image receiving layer is observed when an image of the toner, the quantity of which is larger than 0.3 $mg/cm^2$, is formed. Although the transparency deteriorates in the highlight portion, a practical full color image can be formed if the base of the image receiving sheet is, for example, white and it is used as paper).

Level 2: apparent (offset of the image receiving layer is observed when an image of the toner, the quantity of which is larger than 0.5 $mg/cm^2$, is formed. In a case where any one of three primary colors or two colors are combined and an image is formed in a region in which the density of color images are substantially highest level, that is, in a case of a so-called business graph or the like, the image can be used).

Level 1: the image receiving layer is shifted (offset of the image receiving layer is observed regardless of the quantity of the toner and thus no image is substantially formed).

Evaluation of Deformation of Image

Whether or not deformation or lacking of hair lines or dots are generated after the image has been fixed to the surface of the image receiving sheet was evaluated with three grades.

O: no generation

Δ: slight

X: excessive

Evaluation of Fixing Characteristic

A solid image fixed to the surface of the image receiving sheet was scraped with a sand eraser to evaluate whether or not lacking of the image was evaluated with three grades:

O: no generation

Δ: slight

X: excessive

Evaluation of Winding Resistance

Whether or not winding of the sheet around the heating roller takes place when a toner image is fixed to the image receiving sheet was evaluated with three grades:

O: no generation

Δ: sheet was curled

X: winding took place

EXAMPLE 3-1

A transparent polyethylene terephthalate (PET) film (having a thickness of 100 μm) was employed as the base sheet. Then, polyester resin for forming the image receiving layer to be formed on the base sheet was dissolved with solution in which methylethylketone:toluene=1:1 so that coating solution for forming the image receiving layer was prepared. The coating solution for forming the image receiving layer was applied by using a bar coater in such a manner that the film thickness of the image receiving layer in a dry state is 10 μm to 15 μm so that an image receiving sheet was obtained. A toner image was formed on the image receiving sheet, and then the image receiving sheet having the toner image thereon was supplied to the fixing apparatus so as to be subjected to a heating and pressing process. The fixing apparatus comprised a heating roller (having a diameter of 40 mm and a length of 25 cm) provided with a PFA coating layer (Ra: 0.1 μm and Sm: 30 μm) having JISA hardness of 50°; and a pressing roller (having a diameter of 40 mm and a length of 25 cm) provided with a silicon rubber layer having JISA hardness of 70°. A pressure of 3 $kgf/cm^2$ was applied by using a spring so that the width of the press contact portion (the length of a nip) was made to be 4 mm. As a releasing agent, silicon oil was applied to the surface of the heating roller. The image receiving sheet was conveyed at a liner speed of 110 mm/second when fixing is performed to evaluate the fixing characteristic (the offset resistance and winding resistance) of the image. The quality and the surface smoothness of the obtained fixed image were evaluated. Since the surface smoothness is greatly reflected on the transparency, it was evaluated with the haze indicating the intensity of the transmitted light. The toner for use in the evaluation contained polyester resin as the binding resin and pigment and having silica particle externally added thereto, the toner having an average particle size of 7 μm. The toner had a storage modulus (G') of $2.6\times10^4$ Pa and a loss modulus (G") of $3.8\times10^4$ Pa at the temperatures at which said toner is fixed. The fixing temperature for the toner was a temperature of the surface of the image receiving sheet measured immediately after discharged from the press contact portion of the fixing apparatus by using a radiation thermometer. A result of the measurement was 120° C.

The viscoelasticity and results of the evaluation of the resin for forming the image receiving layer were shown in Table 12.

[TABLE 12]

| Resin | G' (Pa) | G" (Pa) | G"/G' | Offset Resistance | Haze (%) |
|---|---|---|---|---|---|
| 1 | $4.1 \times 10^2$ | $5.2 \times 10$ | 0.13 | 1 | X |
| 2 | $1.2 \times 10^2$ | $1.8 \times 10^2$ | 1.5 | 3 | 15 |
| 3 | $3.7 \times 10^2$ | $2.2 \times 10^3$ | 5.9 | 4 | 21 |
| 4 | $8.6 \times 10^2$ | $5.3 \times 10^4$ | 62 | 4 | 28 |
| 5 | $1.7 \times 10^5$ | $1.9 \times 10^2$ | 0.0011 | 3 | 29 |
| 6 | $3.0 \times 10^5$ | $3.3 \times 10^3$ | 0.011 | 3 | 25 |
| 7 | $2.6 \times 10^5$ | $1.4 \times 10^4$ | 0.054 | 4 | 22 |
| 8 | $2.9 \times 10^5$ | $1.1 \times 10^5$ | 0.38 | 5 | 23 |
| 9 | $3.5 \times 10^5$ | $4.8 \times 10^6$ | 14 | 5 | 46 |
| 10 | $6.2 \times 10^6$ | $4.9 \times 10^6$ | 0.79 | 5 | 58 |
| 11 | $3.2 \times 10$ | $2.4 \times 10$ | 0.75 | 1 | X |
| 12 | $4.7 \times 10$ | $4.5 \times 10^2$ | 9.6 | 2 | 24 |
| 13 | $1.0 \times 10^2$ | $1.1 \times 10^2$ | 1.1 | 3 | 18 |
| 14 | $2.5 \times 10^3$ | $2.0 \times 10^2$ | 0.08 | 3 | 20 |
| 15 | $5.0 \times 10^4$ | $5.8 \times 10^2$ | 0.012 | 3 | 25 |
| 16 | $1.2 \times 10^5$ | $8.7 \times 10^2$ | 0.0073 | 4 | 27 |
| 17 | $6.3 \times 10^3$ | $4.7 \times 10^5$ | 75 | 4 | 30 |
| 18 | $1.4 \times 10^4$ | $1.5 \times 10^5$ | 11 | 4 | 26 |
| 19 | $1.1 \times 10^5$ | $1.2 \times 10^5$ | 1.1 | 5 | 25 |
| 20 | $4.3 \times 10^5$ | $3.3 \times 10^5$ | 0.078 | 5 | 43 |
| 21 | $2.6 \times 10^3$ | $3.7 \times 10$ | 0.014 | 2 | 22 |
| 22 | $2.9 \times 10^3$ | $1.8 \times 10^3$ | 0.62 | 4 | 18 |
| 23 | $4.4 \times 10$ | $3.9 \times 10^3$ | 88 | 2 | 23 |
| 24 | $3.1 \times 10^4$ | $1.4 \times 10^3$ | 0.045 | 4 | 14 |
| 25 | $5.2 \times 10^5$ | $6.3 \times 10^3$ | 0.0012 | 4 | 31 |
| 26 | $2.7 \times 10^4$ | $6.2 \times 10$ | 0.0023 | 2 | 24 |
| 27 | $5.7 \times 10^4$ | $4.2 \times 10^4$ | 0.74 | 4 | 20 |
| 28 | $7.5 \times 10^4$ | $1.6 \times 10^5$ | 21 | 5 | 33 |
| 29 | $1.1 \times 10^3$ | $4.2 \times 10^4$ | 38 | 3 | 26 |
| 30 | $2.2 \times 10^6$ | $4.6 \times 10^4$ | 0.021 | 4 | 36 |

As shown in Table 12, if the storage modulus (G') is $1\times10^2$ Pa to $1\times10^5$ Pa and the loss modulus (G") is $1\times10^2$ Pa to $1\times10^5$ Pa, satisfactory values can be obtained such that the offset resistance or level 3 or higher is realized and the haze is 30% or lower. If the loss tangent (G"/G') is 0.01 to 10, the haze is made to be 25% or lower. Thus, surface smoothness of a level permitting uses as an OHP sheet can be obtained.

EXAMPLE 3-2

Image receiving sheets were manufactured similarly to Example 3-1 and evaluation was performed. The viscoelasticity characteristic of the resin for use as the image receiving layer and results of the evaluation were shown in Table 13. The temperature of the peak value of the loss tangent (G"/G') was measured from 20° C. to 200° C. and a temperature at which the peak value was obtained was employed.

[TABLE 13]

| | Temperature: 120° C. | | G'/G" | | | |
|---|---|---|---|---|---|---|
| Resin | G' (Pa) | G" (Pa) | Peak Value | Temperature | Offset Resistance | Haze (%) |
| 1 | $4.1 \times 10^2$ | $1.8 \times 10^2$ | 3.4 | 45° C. | 1 | X |
| 2 | $2.6 \times 10^3$ | $1.8 \times 10^3$ | 0.84 | 50° C. | 3 | 25 |
| 3 | $8.7 \times 10^3$ | $2.7 \times 10^4$ | 3.9 | 70° C. | 4 | 18 |
| 4 | $3.2 \times 10^4$ | $5.8 \times 10^3$ | 6.8 | 130° C. | 4 | 26 |
| 5 | $7.4 \times 10^2$ | $4.9 \times 10^4$ | 6.6 | 150° C. | 5 | 30 |
| 6 | $1.0 \times 10^5$ | $8.3 \times 10^4$ | 1.5 | 155° C. | 5 | 45 |

As shown in Table 13, when temperature of the peak value of the loss tangent is 50° C. to 150°, both of the offset resistance and haze can be improved.

EXAMPLE 3-3

Image receiving sheets were manufactured similarly to Example 3-1 and evaluation was performed. The viscoelasticity characteristic of the resin for use as the image receiving layer and toner and results of the evaluation were shown in Table 14.

TABLE 14

| | | G'(Pa) | G"(Pa) | G"/G | Offset Resistance | haze (%) | Deformation of Image |
|---|---|---|---|---|---|---|---|
| 1 | Image Receiving Layer | $5.3 \times 10^3$ | $4.3 \times 10^3$ | 0.81 | | | |
| | Toner | $2.6 \times 10^4$ | $3.8 \times 10^4$ | 1.5 | 4 | 19 | ○ |
| 2 | Image Receiving Layer | $2.5 \times 10^3$ | $1.4 \times 10^4$ | 5.6 | | | |
| | Toner | $2.3 \times 10^4$ | $2.7 \times 10^3$ | 0.12 | 4 | 24 | Δ |
| 3 | Image Receiving | $6.4 \times 10^4$ | $9.2 \times 10^3$ | 0.14 | | | |

TABLE 14-continued

| | | G'(Pa) | G"(Pa) | G"/G | Offset Resistance | haze (%) | Deformation of Image |
|---|---|---|---|---|---|---|---|
| | Layer | | | | | | |
| | Toner | $7.0 \times 10^3$ | $3.1 \times 10^4$ | 4.4 | 4 | 23 | Δ |
| 4 | Image Receiving Layer | $2.4 \times 10^4$ | $7.1 \times 10^3$ | 0.29 | | | |
| | Toner | $2.9 \times 10^3$ | $3.1 \times 10^2$ | 0.11 | 4 | 33 | x |

As shown in Table 14, if the storage modulus (G') and the loss modulus (G") of the image receiving layer are smaller than those of the toner, offset resistance and haze can be improved. Moreover, a sharp image free from deformation of the image can be obtained.

EXAMPLE 3-4

Image receiving sheets were manufactured similarly to Example 3-1 and evaluation was performed. The viscoelasticity characteristic of the resin for use as the image receiving layer and toner and results of the evaluation were shown in Table 15.

[TABLE 16]

| Pressure kgf/cm2 | Fixing Characteristics | Winding Resistance | Haze (%) |
|---|---|---|---|
| 0.5 | X | O | 48 |
| 1.0 | Δ | O | 30 |
| 2.0 | O | O | 23 |
| 10.0 | O | O | 22 |
| 20.0 | O | Δ | 25 |
| 25.0 | O | X | X |

As shown in Table 16, if the pressure is included in a range from 1.0 $kgf/cm^2$ to 20.0 $kgf/cm^2$, both of the fixing characteristic and the winding resistance can be improved. In particular, if pressure is 2.0 $kgf/cm^2$ to 10.0 $kgf/cm^2$, an excellent image forming apparatus can be realized.

TABLE 15

| | | Temperature 120° C. | | G"/G' | | Offset | Haze | Deformation |
|---|---|---|---|---|---|---|---|---|
| | | G'(Pa) | G"(Pa) | Peak Value | Temperature | Resistance | (%) | of Image |
| 1 | Image Receiving Layer | $5.3 \times 10^3$ | $4.3 \times 10^3$ | 5.9 | 78° C. | | | |
| | Toner | $2.6 \times 10^4$ | $3.8 \times 10^4$ | 7.2 | 114° C. | 4 | 19 | ○ |
| 2 | Image Receiving Layer | $2.5 \times 10^3$ | $1.4 \times 10^4$ | 2.5 | 73° C. | | | |
| | Toner | $2.3 \times 10^4$ | $2.7 \times 10^3$ | 0.63 | 103° C. | 4 | 24 | Δ |
| 3 | Image Receiving Layer | $6.4 \times 10^4$ | $9.2 \times 10^3$ | 1.7 | 83° C. | | | |
| | Toner | $7.0 \times 10^3$ | $3.1 \times 10^4$ | 6.4 | 95° C. | 4 | 23 | Δ |
| 4 | Image Receiving Layer | $3.2 \times 10^4$ | $5.8 \times 10^3$ | 1.6 | 108° C. | | | |
| | Toner | $2.9 \times 10^3$ | $3.1 \times 10^3$ | 4.1 | 74° C. | 4 | 31 | x |

As can be understood in Table 15, when the image receiving layer has the peak value of loss tangent at a temperature lower than that of the toner, a sharp image free from image deformation can be obtained.

EXAMPLE 3-5

Image receiving sheets were manufactured similarly to Example 3-1 and evaluation was performed. The image receiving sheet, the image receiving layer having the viscoelasticity shown in Table 15-1 as the toner and the toner were used. As the fixing apparatus, the pressure of the heating roller and that of the pressing roller were adjusted by changing the springs. The fixing characteristic which is the securing force of the toner to the image receiving sheet, winding resistance and haze were evaluated. The pressures of the fixing apparatus and results of the evaluation were shown in Table 16.

EXAMPLE 3-6

Image receiving sheets were manufactured similarly to Example 3-1 and evaluation was performed. The image receiving sheet, the image receiving layer having the viscoelasticity shown in Table 15-1 as the toner and the toner were used. As the fixing apparatus, the pressure of the press contact portion is adjusted to 3 $kgf/cm^2$ and the outer diameters of the heating roller and the pressing roller were changed so that the nipping length was changed. The fixing characteristic which is the securing force of the toner to the image receiving sheet, winding resistance, haze and deformation of the image were evaluated. The nipping lengths of the fixing apparatus and results of the evaluation were shown in Table 17.

[TABLE 17]

| Nipping Length | Fixing Characteristic | Winding Resistance | Haze (%) | Deformation of Image |
|---|---|---|---|---|
| 0.3 | Δ | O | 30 | X |
| 0.5 | O | O | 28 | Δ |
| 1.5 | O | O | 20 | O |
| 4.5 | O | O | 18 | O |
| 10.0 | O | O | 30 | O |
| 12.0 | O | Δ | 46 | O |

As shown in Table 17, if the nipping length is 0.5 mm to 10.0 mm, the haze is 30% or lower in addition to the fixing characteristic and the winding resistance. If the length is 1.5 mm to 4.5 mm, excellent surface smoothness can be obtained and no deterioration due to deformation of the image took place. Therefore, it is preferable that the nipping length (L) with respect to pressure (P) be in a range from 0.5 P to 0.5 P+4.

EXAMPLE 3-7

Image receiving sheets were manufactured similarly to Example 3-1 and evaluation was performed. The image receiving sheet, the image receiving layer having the viscoelasticity shown in Table 15-1 as the toner and the toner were used. The average interval (Sm) of the crests of the fixing apparatus was adjusted by grinding the PFA which is the surface layer of the heating roller. The fixing characteristic which is the securing force of the toner to the image receiving sheet and haze were evaluated. The setting of Sm of the heating roller and results of the evaluation were shown in Table 18.

[TABLE 18]

| Sm μm | Fixing Characteristic | Haze (%) |
|---|---|---|
| 10 | O | 38 |
| 20 | O | 30 |
| 30 | O | 23 |
| 100 | O | 24 |
| 140 | O | 30 |

As shown in Table 18, if the average interval (Sm) of the crests is 30 μm or longer, the smoothness of the surface can be improved. In particular, if the interval is 30 μm to 100 μm, an excellent image forming apparatus can be provided.

EXAMPLE 3-8

Image receiving sheets were manufactured similarly to Example 3-1 and evaluation was performed. The image receiving sheet, the image receiving layer having the viscoelasticity shown in Table 15-1 as the toner and the toner were used. The PFA which was the surface layer of the heating roller of the fixing apparatus was ground, the surface roughness (Sm and Ra) were adjusted. The toner classifying condition was changed after pulverization so that particles having different average size were manufactured. The surface roughness of the heating roller, the average size of the toner particles and results of the evaluation were shown in Table 19.

[TABLE 19]

| Surface Roughness of Heating Roller | | Toner Particle Size | | | |
|---|---|---|---|---|---|
| Sm (μm) | Ra (μm) | d (μm) | Sm × Ra | 2d | Haze (%) |
| 44 | 0.33 | 13.5 | 14.52 | 27 | 24 |
| 32 | 0 12 | 6.8 | 3.84 | 13.6 | 18 |
| 63 | 0.24 | 7.9 | 15.12 | 15.8 | 22 |
| 44 | 0.33 | 6.8 | 14.52 | 13.6 | 32 |
| 80 | 0.47 | 7.9 | 37.6 | 15.8 | 42 |

As shown in Table 19, when Sm×Ra≦2d, no air bubble is generated in the image receiving layer. Thus, an image exhibiting excellent transparency can be obtained.

EXAMPLE 3-9

Image receiving sheets were manufactured similarly to Example 3-1 and evaluation was performed. The image receiving sheet, the image receiving layer having the viscoelasticity shown in Table 15-1 as the toner and the toner were used. The fixing apparatus is, as shown in FIG. 3, structured such that two pressing rollers are brought into close contact with the heating roller heated with a predetermined heating value so that two press contact portions were formed. By increasing the number of the pressing rollers, the number of the press contact portions of the apparatus were enlarged. To examine the influence of the n press contact portions on the fixing characteristic, the press contact portions having higher pressure ($kgf/cm^2$) were made to be N1, N2, . . . , Nn in the pressure descending order. Also the order for the image receiving sheet to be allowed to pass was investigated. The conditions of the press contact portions and results of the evaluation were shown in Table 20.

[TABLE 20]

| Number of Press Contact Portions | Sequential Order | Haze (%) |
|---|---|---|
| 3 | N3 → N2 → N1 | 10 |
| 3 | N2 → N1 → N3 | 13 |
| 3 | N1 → N2 → N3 | 22 |
| 2 | N2 → N1 | 24 |
| 2 | N1 → N2 | 30 |
| 1 | N1 | 35 |

As shown in Table 20, by increasing the number of the press contact portions, the smoothness of the surface of the image can be improved if the same heating value is used. When the press contact portion having the highest pressure is disposed in the downstream portion, heat can effectively be used to embed the toner in the image receiving layer.

EXAMPLE 3-10

Figure 4:
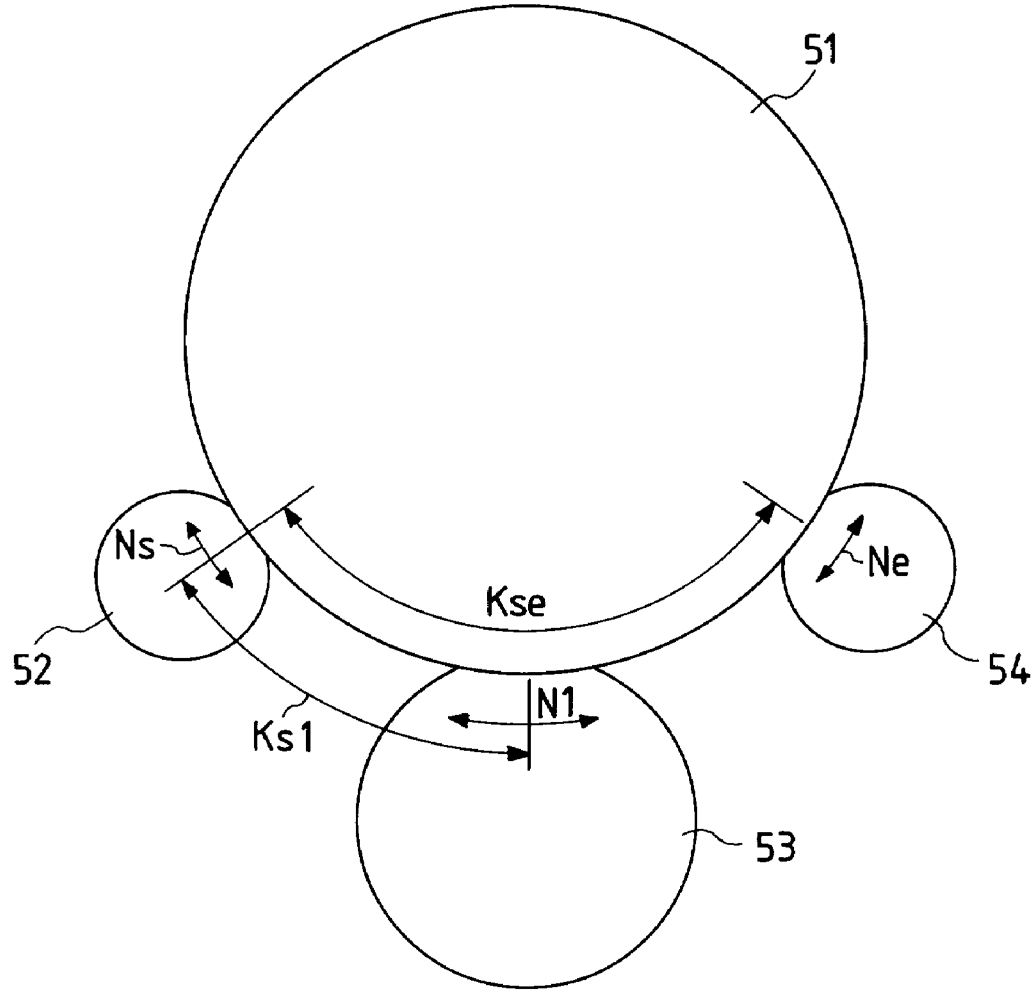
FIG. 4 shows a cross sectional view showing the overall structure of the apparatus having the fixing unit comprising a plurality of the press contact portions.

Image receiving sheets were manufactured similarly to Example 3-1 and evaluation was performed. The image receiving sheet, the image receiving layer having the viscoelasticity shown in Table 15-1 as the toner and the toner were used. The fixing apparatus was structured such that a plurality of pressing rollers were brought into close contact with the heating roller heated with a predetermined heating value to have a plurality of press contact portions. Influence of the n press contact portions on the fixing characteristic was examined by investigating the positional relationship of the press contact portions. FIG. 4 is a cross sectional view of the fixing unit having three press contact portions because pressing rollers 52, 53 and 54 are brought into contact with the heating roller 51. The pressing rollers is pressed with the highest pressure among the three rollers so that the press contact portion N1 is formed. When fixing is performed, the image receiving sheet is moved from the press contact portion Ns formed by the heating roller 51 and the pressing roller 52 to N1, and then allowed to pass through the press contact portion Ne formed by the heating roller 51 and the pressing roller 54 followed by being discharged. As shown in FIG. 4, the distance for which the image receiving sheet on the surface of the heating roller was moved from the most upstream portion (Ns) to the most downstream portion (Ne) was Kse and the distance from the most upstream portion (Ns) to the press contact portion (N1) having the highest pressure was Ks1. The distances Kse and Ks1 were those from the center of the press contact portion. The conditions of the press contact portion and results of the evaluation were shown in Table 21.

[TABLE 21]

| Number of Press contact Portions | Order | Kse | Ksl | Haze (%) |
|---|---|---|---|---|
| 4 | N2 → N4 → N1 → N3 | 50 mm | 30 mm | 10 |
| ↑ | ↑ | 50 mm | 20 mm | 18 |
| 3 | N2 → N1 → N3 | 40 mm | 25 mm | 13 |
| ↑ | ↑ | 40 mm | 18 mm | 24 |

As shown in Table 21, if N1 among the set of the press contact portions is positioned to satisfy Kse/2≦Ks1, that is, in the rear portion from the center, toner can be embedded deeply in the image receiving layer. Thus, the smoothness of the surface of the image can be improved.

EXAMPLE 3-11

Image receiving sheets were manufactured similarly to Example 3-1 and evaluation was performed. The image receiving sheet, the image receiving layer having the viscoelasticity shown in Table 15-1 as the toner and the toner were used. The fixing apparatus was evaluated such that the JISA hardness of the heating roller as the member which was brought into contact with the image receiving layer was made to be Mf and the JISA hardness of the pressing roller forming the most downstream press contact portion was made to be Mb, and the hardness was varied to perform investigation. The varied hardness and results of the evaluation were shown in Table 22.

[TABLE 22]

| Number of Press Contact Portions | Mf | Mb | Haze (%) | Winding Resistance |
|---|---|---|---|---|
| 3 | 50° | 60° | 13 | O |
| 3 | 60° | 60° | 18 | O |
| 3 | 60° | 50° | 23 | Δ |

[TABLE 22]-continued

| Number of Press Contact Portions | Mf | Mb | Haze (%) | Winding Resistance |
|---|---|---|---|---|
| 2 | 50° | 70° | 22 | O |
| 2 | 70° | 50° | 28 | Δ |

As shown in Table 22, when Mf≦Mb, the smoothness of the surface of the image can be improved. Moreover, the winding resistance can effectively be improve.

(4) With respect to the image receiving layer composed of aromatic ester compound:

In this embodiment, the offset resistance and transparency (haze) of the formed image are evaluated by the similar method as described in the aforementioned (3). Further, the ester value of the resin is measured by a method conforming to JIS K0070.

EXAMPLE 4-1

As the resin component for forming the image receiving layer, polyester resin prepared by the following method is employed.

Initially, an alcohol component and a carboxylic acid component for forming required resin are injected into a reactor having a distilling column. Then, antimony trioxide is added by 0.05 wt % with respect to the overall oxide components, followed by heating and stirring the solution under existence of nitride to polycondensate the same to make the weight average molecular weight Mw to be about 100,000 so that polyester resin for the image receiving layer is obtained.

Then, the image receiving sheet is manufactured as follows:

As the base sheet, a transparent polyethyleneterephthalate (PET) film (having a thickness of 100 μm) is obtained. The polyester resin for forming the image receiving layer is dissolved by solution in which methylethylketone:toluene=1:1 so that coating solution for forming the image receiving layer is prepared. The prepared coating solution is, by using a bar coater, applied to the surface of the base in such a manner that the film thickness of the dried image receiving layer is 10 μm to 15 μm. Then, the applied wet solution is dried so that the image receiving layer made of the polyester resin is formed and thus the image receiving sheet is obtained.

Then, a toner image is formed on the above-mentioned image receiving sheet, and then the image receiving sheet having the image is allowed to pass through the fixing means so that the image is fixed.

Note that resin for the toner is polyester resin subjected to the polycondensation, similarly to the resin for forming the image receiving layer.

The compositions of the polyester resin to serve as the image receiving layer and the alcohol component and the carboxylic acid component for forming the resin in the toner, and results of evaluations of the image receiving sheet are shown in Table 23. Note that the abbreviations in the table below indicate the following material. Whether or not an aromatic ring is included in the molecular structure of the resin for forming the image receiving layer and the toner is shown in the table below.

Diol A: 4,4'-isopropylidene diphenol
Diol B: diethylglycol
Carboxylic Acid A: terephthalic acid
Carboxylic Acid B: adipic acid

[TABLE 23]

| Example | | Alcohol Component (diol) | Carboxylic acid Component | Aromatic Ring | Haze (%) |
|---|---|---|---|---|---|
| 1 | Image Receiving Layer | A | A | Included | 20 |
| | Toner | A | A | Included | |
| 2 | Image Receiving Layer | B | A | Included | 25 |
| | Toner | A | B | Included | |
| 3 | Image Receiving Layer | A | B | Included | 28 |
| | Toner | B | A | Included | |
| 4 | Image Receiving Layer | A | A | Included | 34 |
| | Toner | B | B | Excluded | |
| 5 | Image Receiving Layer | B | B | Excluded | 45 |
| | Toner | B | B | Excluded | |

If aromatic ester is included in the image receiving layer as shown in Table 23, haze is 35% or lower so that satisfactory light transparency is obtained. If the aromatic ester is as well as included in the resin in the toner, the haze is made to be 30% or lower. Thus, a further satisfactory light transparency can be obtained. Although the reason for this has not been detected, the fact that the aromatic ring is included in the resin causes the aromatic ring to be oriented and thus crystallization is enhanced as a result of the investigation of the inventors. That is, since the resin has the high crystallinity, the crystalline components are, attributable to heating, fused prior to the amorphous components. Therefore, dissolving of the resin smoothly proceeds, thus causing the melted resin in the image receiving layer to quickly be introduced into gaps between toner particles. Thus, the gaps can be removed. Since aromatic ester resin is employed as the resin in the toner, gaps between toner particles can easily be removed as a result of the mutual fusion of the toner particles. Therefore, it is preferable that both of the toner and the image receiving layer be made of aromatic ester resin.

Since both elements are made of the aroma tic ester resin, the aromatic rings of both of the resins are harmoniously and integrally oriented in the state where the resins in both of the toner and the image receiving layer are mixed after fixing has been performed, crystallization is enhanced. Thus, wear resistance of the fixed image on the image receiving sheet can be improved. Specifically, the wear resistance of the image was evaluated such that the above-mentioned image receiving sheet was rubbed 100 times with a rubber eraser ER-502 manufactured by LION CORPORATION under a load of 1 kg. As a result, the image density (which is measured by a known method, for example, by a reflection optical density meter manufactured by Macbeth Co.) was lowered excessively (lowered by 28% from the image density before rubbing) in Example 5, it was apparently lowered (lowered by 20% from the image density before rubbing) in Example 4, and it was slightly lowered (lowered by 15% from the image density before rubbing) in Examples 1 to 3. Thus, it is preferable that both of the toner and the image receiving layer contain the aromatic ester resin.

It is preferable that both of the alcohol component and the carboxylic acid component for forming the polyester resin for forming the image receiving layer and the toner contain the aromatic ester.

EXAMPLE 4-2

Similarly to Example 4-1, polyester resin for forming the image receiving layer was polycondensed.

When polycondensation was performed, the reaction time using heating and stirring was changed to obtain polyester resins having different molecular weight distributions such that Mw is about 100,000 (high molecular weight component) and Mw is about 5,000 (low molecular weight component). The polyester resins having different molecular weight distributions were dissolved in solution in which methylethylketone:toluene=1:1, followed by being sufficiently mixed. Then, the solution was applied to the base sheet so that the image receiving sheet was obtained. As the resin for forming the toner, the polyester resin according to Example 1 and prepared by polycondensing diol A and carboxylic acid A was employed. The composition of the alcohol component and the carboxylic acid component of the high molecular weight component and the low molecular weight component for forming the polyester resin for use as the image receiving layer and results of evaluation of the image receiving sheet were shown in Table 24.

[TABLE 24]

| Example | Composition Upper: high molecular weight component Lower: low molecular weight component | Mixture ratio (%) | Aromatic Ring | Haze (%) |
|---|---|---|---|---|
| 6 | diol A + carboxylic acid A | 50 | Included | 20 |
| | diol A + carboxylic acid A | 50 | Included | |
| 7 | diol A + carboxylic acid A | 50 | Included | 28 |
| | diol B + carboxylic acid B | 50 | Excluded | |
| 8 | diol B + carboxylic acid B | 50 | Excluded | 25 |
| | diol A + carboxylic acid A | 50 | Included | |
| 9 | diol B + carboxylic acid B | 80 | Excluded | 30 |
| | diol A + carboxylic acid A | 20 | Included | |
| 10 | diol B + carboxylic acid B | 90 | Excluded | 34 |
| | diol A + carboxylic acid A | 10 | Included | |
| 11 | diol B + carboxylic acid B | 95 | Excluded | 43 |
| | diol A + carboxylic acid A | 5 | Included | |
| 12 | diol B + carboxylic acid B | 50 | Excluded | 45 |
| | diol B + carboxylic acid B | 50 | Excluded | |

As shown in Table 24, when at least either the high molecular weight component or low molecular weight component resin for forming the image receiving layer is the aromatic ester compound, excellent transparency can be obtained. In particular, it is preferable that both of the high molecular weight component and the low molecular weight component contain the aromatic ester. In a case where only either the high molecular weight component and the low molecular weight component is the aromatic ester compound, satisfactory transparency can be obtained if the low molecular weight component is the aromatic ester compound. The reason for this is that the low molecular weight component, which is fused faster than the high molecular weight component and which also has lower melting viscosity, can easily be introduced into the gap between the toner particles. Since the high molecular weight component has a great effect of improving the offset resistance of the image receiving layer, a structure is employed in which the low molecular weight component is the aromatic ester compound and the high molecular weight component is resin having excellent offset resistance regardless of the fact that the high molecular weight component is the aromatic ester compound. The functions of the resins are separated so that an image receiving sheet having excellent total performance is formed.

When it is contained by 10 wt % or more of the resin for forming the image receiving layer, excellent light transparency can be obtained. In particular, it is preferable that it is contained by 20 wt % or more.

EXAMPLE 4-3

The high molecular weight component of the resin for forming the image receiving layer was the polyester resin prepared by polycondensing diol A and carboxylic acid A employed in Example 4-1. When the coating solution for forming the image receiving layer is prepared, a ester component was added by 30 wt % as the low molecular weight component. The thus-obtained coating solution for forming the image receiving layer was applied to the base sheet so that the image receiving sheet was manufactured. As the resin for forming the toner, the polyester resin prepared by polycondensing diol A and carboxylic acid A employed in Example 4-1 was employed. To examine the fixing characteristic of the image receiving sheet at lower temperatures, the temperature of the surface of the heating roller was set in such a manner that the temperature of the surface of the image receiving sheet immediately discharged from the press contact portion of the fixing apparatus is 120° C. when measured by a radiation thermometer. The ester compound employed as the low molecular weight component for the image receiving layer and results of evaluation performed at the fixing temperature of 120° C. are shown in Table 25.

Aromatic ester compounds C to J which are low molecular weight components are the following compounds.

C: tri-2-ethylhexyltrimellitate
D: triphenyl phosphate
E: di-n-octylphthalate
F: 2,2'-biphenyldi-n-octylcarborate
G: dicyclohexylphthalate
H: phenyl-n-octylcarborate
I: di-n-octyladipate
J: trioctylphosphate

[TABLE 25]

| Example | Low Molecular Weight Component | Aromatic Ring | Haze (%) |
|---|---|---|---|
| 13 | C | Included | 29 |
| 14 | D | Included | 31 |
| 15 | E | Included | 18 |
| 16 | F | Included | 21 |
| 17 | G | Included | 25 |

[TABLE 25]-continued

| Example | Low Molecular Weight Component | Aromatic Ring | Haze (%) |
|---|---|---|---|
| 18 | H | Included | 28 |
| 19 | I | Excluded | 39 |
| 20 | J | Excluded | 42 |

As shown in Table 25, when the ester compound (Examples 13 to 17) having an aromatic ring is employed as the low molecular weight component, transparency of the image receiving sheet can be obtained even if fixing is performed at low temperatures. When dihydric phenyl carboxylate (Examples 15 to 17) is employed, the transparency can furthermore be improved. When dihydric phenyl alkyl carboxylate (Examples 15 and 16) is employed, the transparency can furthermore be improved. It is most preferable that alkyl phthalate (Example 15) be employed. To orient the aromatic ring and enhance the crystallinity, it is an important factor that the polarity of the functional group, which is bonded to the aromatic ring and the stereoscopic structure of the function group do not inhibit the foregoing effects. Since dihydric phenyl carboxylate further reduces steric hindrance around the aromatic ring as compared with the trihydric or higher phenyl carboxylate, the crystallization is enhanced. If the monohydric phenylcarboxylate is employed, the steric hindrance is further reduced and the crystallization is enhanced. However, the crystallinity is raised excessively, the birefringence effect and light scattering attributable to the crystal deteriorate the transparency. Therefore, it is preferable that the dihydric phenylcarboxylate be employed.

EXAMPLE 4-4

As the high molecular weight components for the resin for the toner and the resin for the image receiving layer, the polyester resin obtained by polycondensing diol A and carboxylic acid A was employed, similarly to Example 4-3. When the coating solution for the image receiving layer is prepared, dialkyl phthalate having different alkyl chain lengths were added in a required quantity as the low molecular weight component. The coating solution for the image receiving layer was applied to the base sheet so that the image receiving sheet was manufactured. The fixing temperature was set similarly to Example 4-3 such that the temperature of the surface of the heating roller was set in such a manner that the temperature of the surface of the image receiving sheet immediately discharged from the press contact portion of the fixing apparatus is 120° C. when measured by a radiation thermometer. The number of carbon atoms for forming the alkyl chain of the dialkyl phthalate employed as the low molecular weight component of the image receiving layer, the mixture ratio and results of the evaluation performed at the fixing temperature of 120° C. were shown in Table 26. Note that symbol Cn indicates the length of the alkyl chain of at least one of the alkyl groups of the dialkyl phthalate. Specifically, it is expressed by number n of the carbon atoms C for forming the alkyl chain.

[TABLE 26]

| Length of Alkyl Chain Cn | | Mixture Ratio (wt %) 30 | 40 | 50 |
|---|---|---|---|---|
| n = 4 | Haze (%) | 33 | 27 | X |
| | Offset Resistance | 2 | 2 | 1 |
| n = 5 | Haze (%) | 29 | 25 | 13 |
| | Offset Resistance | 3 | 3 | 2 |
| n = 8 | Haze (%) | 18 | 15 | 13 |
| | Offset Resistance | 4 | 3 | 2 |
| n = 15 | Haze (%) | 21 | 16 | 13 |
| | Offset Resistance | 4 | 3 | 2 |
| n = 20 | Haze (%) | 28 | 25 | 18 |
| | Offset Resistance | 4 | 3 | 2 |
| n = 25 | Haze (%) | 45 | 38 | 24 |
| | Offset Resistance | 5 | 3 | 2 |

Alkyl phthalate is composed of a phthalic acid portion having a polarity and an alkyl portion having no polarity. When alkyl phthalate is employed as the low molecular weight component of the image receiving layer, the orientation of the phthalic acid portion having the polarity and the aromatic ring is not inhibited by the non-polarity portion. Since hydrogen atoms in the non-polarity portion raise the density of $\pi$ electrons in the aromatic ring in the polarity portion, crystallization is furthermore enhanced. Since transference effect attainable from hydrogen atoms in the non-polarity portion is improved depending upon the number of hydrogen atoms, that is, the length of the alkyl chain, the effect of raising the density of $\pi$ electrons in the polarity portion is unsatisfactory if the number of the carbon atoms for forming the alkyl chain is smaller than five. Therefore, required orientation cannot take place. Therefore, it is preferable that the length of the alkyl chain be five or more.

If the number of carbon atoms for forming the alkyl chain exceeds 20, the molecular weight of the alkyl phthalate is enlarged. Therefore, the steric hindrance around the aromatic ring becomes excessive because the alkyl chain is elongated. Therefore, fusing cannot take place quickly at low fixing temperatures. As a result, the interface between toner particles or the toner and the image receiving layer cannot completely be removed. Thus, the transparency is made relatively low. Therefore, it is preferable that the length of the alkyl chain be 20 or shorter.

If the quantity of alkyl phthalate serving as the low molecular weight component of the image receiving layer exceeds 40 wt % of the components which form the image receiving layer, the offset resistance deteriorates though transparency can be improved. Therefore, it is preferable that dialkyl phthalate be contained by 40 wt % or lower, more preferably 30 wt % or lower.

EXAMPLE 4-5

As the high molecular weight components for the resin in the toner and that for the resin for the image receiving layer, polyester resin obtained by polycondensing diol A and carboxylic acid A was employed, similarly to Example 4-3. When the coating solution for the image receiving layer was prepared, di-n-octylphthalate having different ester values were added by 30 wt % as the low molecular weight component. The coating solution for the image receiving layer was applied to the base sheet so that the image receiving sheet was manufactured. The fixing temperature was set to be 120° C., similarly to Example 4-3. Moreover, the fixing characteristic was evaluated under high temperature and high humidity (35° C./65% Rh) conditions. The ester values of the di-n-octylphthalate employed as the low molecular weight component of the image receiving layer and results of the evaluation performed at the fixing temperature of 120° C. were shown in Table 27.

[TABLE 27]

| Ester Value (mg KOH/g) | Haze (%) | Offset Resistance |
|---|---|---|
| 220 | 18 | 4 |
| 200 | 20 | 3 |
| 170 | 25 | 2 |

If the ester value of alkyl phthalate employed as the low molecular weight component of the image receiving layer is 200 mgKOH/g or smaller, it can be considered that a multiplicity of free carboxylic groups exist. In an environment of high temperature and high humidity, water can easily be adsorbed by the surface of the image receiving layer. Therefore, the image deteriorates when fixing is performed. It is furthermore preferable that the value be 220 mgKOH/g or larger.

(5) With respect to the Rockwell hardness of the image receiving layer:

In this embodiment, the transparency (haze) of the image are evaluated by the similar method in (2). Further, other physical property values and methods of measuring the values for use will now be described.

Rockwell Hardness

The Rockwell hardness (R scale) is measured by a measuring method regulated with ASTM-D785. When the Rockwell hardness of the image receiving sheet is measured, a sample to be measured is formed by stacking a plurality of the image receiving sheets while bringing the image receiving sheets close contact with each other such that each image receiving layer faces upwards to have a thickness (about 6 mm) required to measure the Rockwell hardness and any gap does not exist. In a case where the Rockwell hardness of the base of the image receiving sheet is measured, members each of which is obtained by removing the image receiving layer from the image receiving sheet by a solvent or a mechanical means are stacked similarly to the image receiving sheets so that a sample to be measured is obtained.

When the Rockwell hardness of the image receiving layer is measured, the Rockwell hardness of each of the image receiving sheet and the base is measured. Moreover, the Rockwell hardness of the image receiving sheet is made to correspond to the ratio of the thickness and the Rockwell hardness of each of the base and the image receiving layer so the Rockwell hardness is obtained by calculation. As an alternative to this, members, each of which has been obtained by removing the image receiving layer by the solvent or a mechanical means, are stacked in a quantity to realize a thickness which is sufficient to serve as the sample to be measured. Then, the obtained members are melted by a solvent or with heat, followed by again solidifying the same to obtain the sample to be measured. Since the latter method sometimes encounters a chemical change or the like before the sample to be measured is made, it is preferable that the former method be employed. The thickness of the image receiving layer may be observed and measured by an optical microscope or an electronic microscope. As an alternative to this, the thickness may be obtained by calculation using the difference between the thickness of the image receiving sheet and the thickness of the base.

When the Rockwell hardness of toner is measured, toner is accumulated in a quantity capable of realizing a thickness which is sufficient to serve as the sample to be measured. Then, the toner is melted with heat, and then again solidified so as to be used as the sample to be measured.

Hardness of the Elastic Member of the Transfer Means

The hardness of the elastic member of the transfer means (corresponds to the secondary transfer roller 18 in the image forming apparatus shown in FIG. 2) is measured by a method having the steps of stacking members, each of which has been obtained by mechanically removing the elastic member from the transfer means, to have a thickness sufficient to measure the hardness so that a sample to be measured is obtained. Then, a hardness meter ASKER-C (manufactured by KOBUNSIKEIKI Co.) is used to measure the hardness.

Degree of Coagulation

The degree of coagulation is measured by using Powder Tester (PT-E) manufactured by HOSOKAWA MICRON Co. as follows.

(A) The following three sieves are set on a vibration frame in a descending order of the diameter of each opening:

Diameter of Opening of the Lower Sieve: 74 $\mu$m

Diameter of Opening of the Middle Sieve: 149 $\mu$m

Diameter of Opening of the Upper Sieve: 250 $\mu$m (B) Developer for use in the measurement is weighed by 2 g and placed on the uppermost sieve.

(C) The amplitude of the vibration frame is set to be 1 mm and the vibration frame is vibrated for 90 seconds.

(D) After the vibration has been completed, the weight of toner left on each sieve is weighed.

(E) The following equations are used to calculate the degree of coagulation:

a=(weight of toner left on the upper sieve (g))/2 g×100 b=(weight of toner left on the middle sieve (g))/2 g×100×3/5 c=(weight of toner left on the lower sieve (g))/2 g×100×1/5

Degree of Coagulation (%)=a+b+c

Thus, the degree of coagulation can be obtained. That is, the smaller the degree of coagulation is, the fluidity of toner is further raised.

The shape factor of the toner is defined such that, for example, FE-SEM (S-800) manufactured by Hitachi, Ltd. is used to enlarge 100 toner images each of which has been enlarged to a magnification of 500 times. Obtained information of the images is analyzed by using, for example, an image analyzing apparatus (Luzex III) manufactured by Nicore Co. A value calculated by the following equation is defined to be a shape factor.

Shape Factor (SF-1)=$(MXLNG)^2$/AREA×π/4×100

Shape Factor (SF-2)=$(PERI)^2$/AREA×¼π100 p In the equations above, MXLNG indicates an absolute maximum length of the toner, PERI indicates the circumference of the toner and AREA indicates the projected area of the toner.

The shape factor SF-1 indicates the degree of roundness of the toner, while shape factor SF-2 indicates the degree of waviness of the toner.

Toner manufactured by melt kneading and pulverization method is in the form of a monothilic shape and usually having a shape factor SF-1 exceeding 150 and a shape factor SF-2 exceeding 140. If shape factor SF-1 exceeds 150, the shape becomes different from the spherical shape and approximates the monothilic shape. Thus, a non-fixed toner image transferred to the surface of the image receiving sheet is brought to a state where large gaps between toner particles and between the toner and the surface of the image receiving sheet can easily be generated. As a result, an interface can easily be formed between the toner particle and the toner and the image receiving sheet when fixation is performed. In order to further satisfactorily prevent generation of the interface in the fixed toner image, it is preferable that shape factor SF-1 of the toner be 100 to 150, more preferably 100 to 130.

If shape factor SF-2 of toner exceeds 140, the surfaces of toner particles cannot be smoothed, that is, toner particles have a multiplicity of irregular portions. Therefore, a non-fixed toner image transferred to the surface of the image receiving sheet is brought to a state where large gaps between toner particles and between the toner and the surface of the image receiving sheet can easily be generated. As a result, an interface can easily be formed between the toner particle and the toner and the image receiving sheet when fixation is performed. In order to further satisfactorily prevent generation of the interface in the fixed toner image, it is preferable that shape factor SF-2 of the toner be 100 to 140, more preferably 100 to 125.

The contact angle made by the image carrier from surface water is measured by a known method, for example, a sessile drop method. Specifically, it is measured by a contact angle meter manufactured by KYOWA KAIMEN KAGAKU Co.

The quantity of toner image dispersion is defined and measured with the image forming apparatus according to the present invention.

Figure 6:
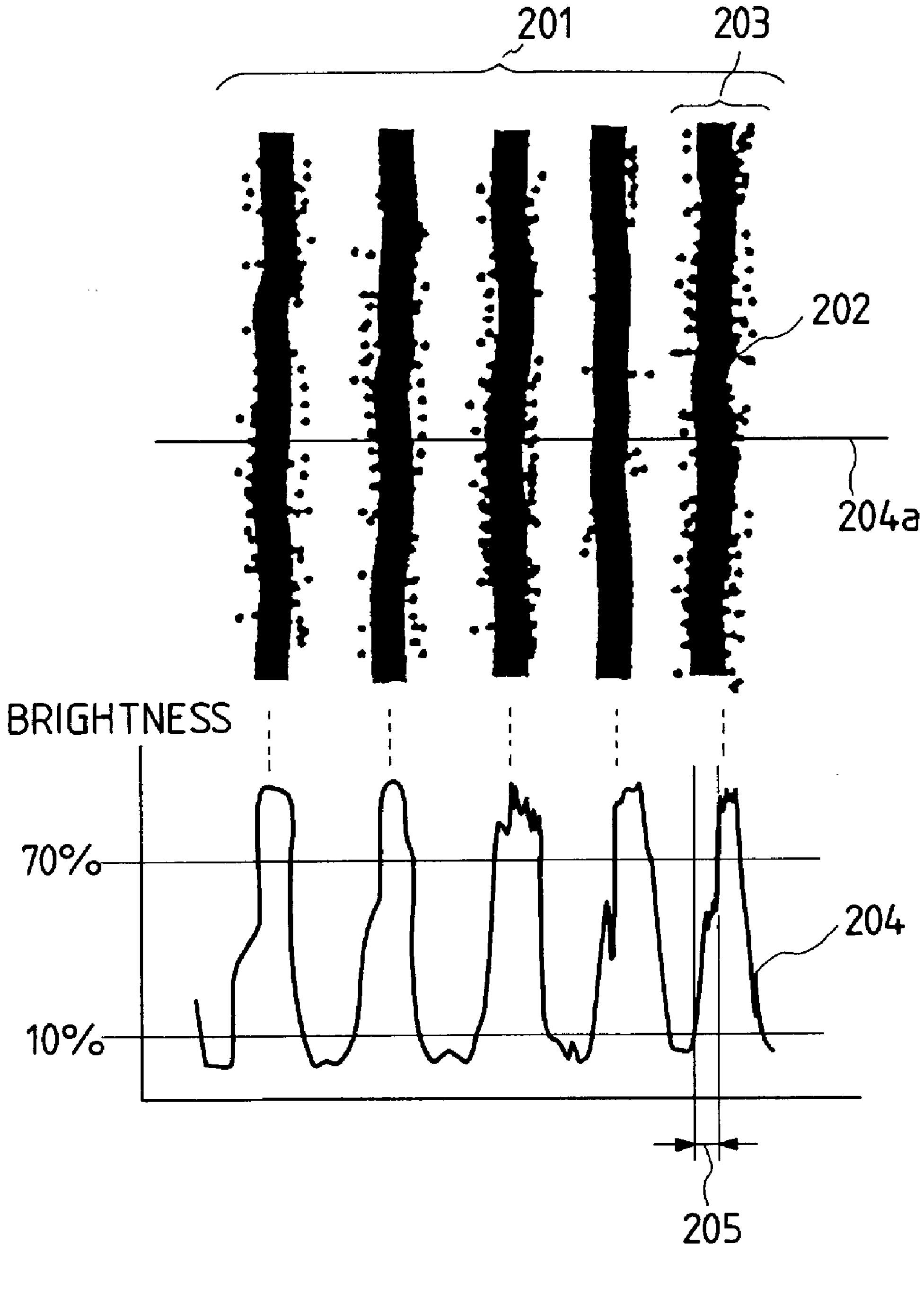
FIG. 6 shows a schematic view showing the method of measuring the quantity of image dispersion occurring in the image forming apparatus according to the present invention.

FIG. 6 is a diagram showing the quantity of image dispersion in the image forming apparatus according to the present invention. The image dispersion is a phenomenon in which a portion of toner which must form an image is dispersed to the portion around the toner image. It is usually takes place when toner is transferred from the image carrier to the recording medium.

Referring to FIG. 6, an enlarged image 201 for use to measure the quantity of image dispersion is a set of a plurality of, for example, hair lines 202 at intervals. Dispersed image portions 203 are distributed around the hair line 202. The enlarged image 201 can be obtained by setting a usual optical microscope to an arbitrary magnification. An image obtained by photographing the enlarged image by a CCD camera or the like is taken into an arbitrary image forming apparatus. By using the image forming apparatus, a brightness profile 204 of an image dispersion measurement line 204*a* perpendicular to a direction in which the hair lines 201 are aligned. Assuming that the peak value (low brightness) of the hair line 202 of the brightness profile 204 is defined to be brightness of 100% and the peak value (high brightness) of non-image portion which is a gap between arranged hair lines 202 is defined to be brightness of 0%, a plurality of distances 205 between 70% point and 10% point of the brightness profile are measured so that an image dispersion quantity is obtained by calculating an average value.

Note that it is preferable that an image which is a set of hair lines or dots arranged at intervals of 80 $\mu$m to 2 mm be employed so as to be measured. The image to be measured may be a print pattern. If the image has a screen structure, lines or dots forming the screen may be employed as it is.

The color development characteristic of the fixed image is evaluated such that the color of a toner image fixed on the surface of the image receiving sheet under a usual fixing condition is measured. Then, an image formed by the same toner is sufficiently melted so that the color of an image, from which light scattering factors, such as the interface of the image caused by the toner is removed, is measured as the reference image. The chrominance between the two images is measured. Images having chrominance exceeding 10 are evaluated to be x. That is, the image is evaluated such that a practical multi-color image cannot be formed. Images having chrominance not greater than 10 is evaluated to be Δ. That is, the images are evaluated such that an observer is able to recognize the color tone of the image as the original tone of the image and thus the image can practically be employed as a multi-color image including no halftone image, that is, a so-called a business graph. Images having chrominance not more than 7 is evaluated to be O. That is, the observer is able to recognize the color tone of the image as the original tone of the image and thus the image can practically be used as a multi-color image including a halftone portion, that is, a so-called full color image. Images having chrominance not greater than 4 are evaluated to be ⊚. That is, the observer is able to recognize the color of the image as the same as the original color tone of the image and the image can practically be used as a full color image. In this embodiment, the same fixing means is employed except for a setting such that a toner image on the image receiving sheet is supplied with heat energy which is five times or greater than the energy included in the usual fixing condition. Note that toner and image for use to evaluate the color development characteristic are similar to those used in the evaluation of the transparency.

The color of the image is measured by using Color Eye CE 2000 which is a spectrophotometer manufactured by Macbeth Co. Note that the measuring conditions conform to CIE-Lab JIS D-65 2° including luster components.

Examples of the present embodiment will now be described.

EXAMPLE 5-1

This example relates to the image forming apparatus and the Rockwell hardness of the image receiving layer of the image receiving sheet applied to the image forming apparatus.

The specific structure of this example will now be described.

As the intermediate transfer belt, a seamless belt having a structure such that conductive carbon black is dispersed in polycarbonate resin is employed. The secondary transfer roller has a structure such that a metal shaft having a diameter of 15 mm is covered with urethane resin having ASKAR-C hardness of 25 and a thickness of 5 mm. The secondary transfer roller is adjusted to press the intermediate transfer belt under pressure of 40 g/cm.

Toner is manufactured by the pulverization method to have a monothilic shape, an average particle size of 6 $\mu$m and degree of coagulation of 3%.

As the resin forming the toner, thermoplastic polyester resin is employed. The Rockwell hardness (R scale) HRt of the toner is 63.

Transferring voltages respectively applied to the first transfer roller and the secondary transfer roller are adjusted in such a manner that the quantity of non-fixed toner on the image receiving sheet is 0.5 mg/cm$^2$. Note that the density of the fixed image is 1.0 in this case.

In this embodiment, the quantity of image dispersion is 15 $\mu$m.

The Rockwell hardness (R scale) HRa of the image receiving layer of the image receiving sheet according to this example is adjusted such that resin manufactured by polymerizing monomers each having a chemical structure which is substantially the same as that of a monomer forming the binding resin in the toner is used and the degree of polymerization of the resin, the average molecular weight of the resin and distribution of the molecular weight are adjusted. The formed image receiving layer has a thickness of 6 $\mu$m.

In this example, the transparency (the haze) of each of image receiving sheets comprising image receiving layers having different Rockwell hardnesses (R scale) was evaluated. Results are shown in Table 28.

[TABLE 28]

| HRa | Haze |
|---|---|
| 124 | X |
| 121 | Δ |
| 118 | O |
| 111 | O |
| 88 | O |
| 63 | O |
| 58 | ⊚ |

Note that the foregoing image receiving sheets were cut by a diamond cutter to observe their cross sections. As a result, the image receiving sheet comprising the image receiving layer having the Rockwell hardness (R scale) HRa of 124 had small air bubbles and an interface observed between the toner and the image receiving layer.

As can be understood from the above-mentioned results, satisfactory transparency can be obtained by making the Rockwell hardness (R scale) HRa of the image receiving layer to be 121 or less, preferably 111 or less.

The reason for this is that the pressure of the secondary transfer roller enlarges, at the secondary transfer position, the area of contact between the image receiving layer of the image receiving sheet and the toner and thus gaps between the toner and the image receiving layer are removed. Therefore, when fixing is performed by the fixing means, forcible introduction of the toner into the image receiving layer while maintaining the gaps between the toner and the image receiving layer can be prevented.

In accordance with a fact detected by the inventors of the present invention, removal of the external additive allowed to adhere to the surfaces of the toner particles is an effective means to remove gaps between the toner and the image receiving layer, that is, before the fixing process is performed by enlarging the area of contact between the image receiving layer of the image receiving sheet and the toner. That is, the external additive allowed to adhere to the surfaces of the toner particles usually exist in a state of secondary particles. The external additive serves like a spacer between the toner and the image receiving layer to cause a gap to be generated between the toner and the image receiving layer. Therefore, by pressing the toner into the image receiving layer at the transfer position, secondary particles of the external additive existing between the toner and the image receiving layer are crushed before the fixing process is performed. Moreover, by sufficiently lowering the hardness of the image receiving layer, the crushed external additive can be forcibly introduced into the image receiving layer and the substantial area of contact between the toner and the image receiving layer can be enlarged. Although embedding of the overall quantity of the external additive existing between the toner and the image receiving layer into the toner attains a similar effect, excessive reduction in the Rockwell hardness of the toner must be avoided because the durability of the toner deteriorates. Therefore, the Rockwell hardness of the image receiving sheet is required to be reduced as well as reducing the Rockwell hardness of the toner so as to embed the external additive into the toner and the image receiving layer in order to enlarge the substantial area of contact between the toner and the image receiving layer. The enlargement of the area of contact between the toner and the image receiving layer enlarges the image force and the intermolecular force between the toner and the image receiving layer and the adhesive force realized by low molecular resin components in the image receiving layer or the toner. Therefore, lacking and deformation of an image formed by non-fixed toner on the image receiving sheet can be prevented during conveyance of the image from the transfer means to the fixing means.

The wear resistance of the image was evaluated such that the above-mentioned image receiving sheet was rubbed 10 times with a rubber eraser ER-502 manufactured by LION CORPORATION under a load of 1 kg. As a result, the image receiving sheet comprising the image receiving layer having the Rockwell hardness (R scale) HRa of 58 encountered excessive lowering of the image density (the density was lowered by 28% from the image density before the rubbing operation was performed). However, the other image receiving sheets encounters slight lowering (lowering of the image density was 15% or less) of the image density. Therefore, it is preferable that the Rockwell hardness (R scale) HRa of the image receiving layer be 63 or more.

EXAMPLE 5-2

This example relates to the pressure of the transfer means of the image forming apparatus according to the Present invention.

The specific structure of this example is formed similarly to that according to Example 5-1 except for the pressure applied at the position of contact between the secondary transfer roller and the intermediate transfer belt which are transfer means.

Results of this example are shown in Table 29.

[TABLE 29]

| | Haze | | | |
|---|---|---|---|---|
| | Pressure of Transfer Means (kg/cm) | | | |
| HRa | 30 | 40 | 100 | 180 |
| 121 | X | Δ | Δ | Δ |
| 118 | X | Δ | Δ | O |
| 111 | X | O | O | O |
| 58 | Δ | ◎ | ◎ | ◎ |

As can be understood from the results above, satisfactory transparency can be obtained by making the pressure at the position of contact between the secondary transfer roller and the intermediate transfer belt which are transfer means to be 40 kg/cm or more, preferably 180 kg/cm or more.

EXAMPLE 5-3

This example relates to the hardness of the transfer means of the image forming apparatus according to the present invention.

The specific structure of this example is similar to that according to Example 5-1 except the hardness of the elastic member of the secondary transfer roller which is the transfer means.

Results of this example are shown in Table 30.

[TABLE 30]

| | Haze | | | |
|---|---|---|---|---|
| | Hardness of Transfer Means (ASKER-C hardness) | | | |
| HRa | 15 | 25 | 70 | 80 |
| 121 | X | Δ | Δ | X |
| 118 | X | Δ | O | X |
| 111 | X | O | O | Δ |
| 58 | O | ◎ | ◎ | O |

As can be understood from the above-mentioned results, satisfactory color development characteristic can be obtained when the hardness (ASKER-C hardness) of the elastic member of the secondary transfer roller which is the transfer means is 25 degree or more and 70 degree or lower.

The reason for this will now be described. If the hardness of the transfer means is too small, the plane pressure at the transference position is lowered. Thus, crushing of the external additive and embedding of the crushed external additive into the image receiving layer cannot satisfactorily be performed and thus the haze cannot sufficiently be lowered. If the hardness of the transfer means is too large, the state of contact between the secondary transfer roller and the image receiving sheet becomes instable at the transference position. Thus, lacking of an image takes place when transference is performed and therefore the quality of the image deteriorates.

EXAMPLE 5-4

This example relates to the hardness of the toner of the image forming apparatus according to the present invention and the hardness of the image receiving layer of the image receiving sheet.

The specific structure of this example is similar to that according to Example 5-1 except for the Rockwell hardness (R scale) HRt of the toner.

Results of this example are shown in Table 31.

[TABLE 31]

| Haze | | | |
|---|---|---|---|
| | HRt | | |
| HRa | 63 | 88 | 95 |
| 111 | O | O | O |
| 88 | O | O | ◎ |
| 63 | O | ◎ | ◎ |
| 58 | ◎ | ◎ | ◎ |

As can be understood from the results above, satisfactory color development characteristic can be obtained in the present invention if the Rockwell hardness (R scale) HRt of the toner is smaller than the Rockwell hardness (R scale) HRa of the image receiving layer. By making the Rockwell hardness (R scale) HRt of the toner to be larger than the Rockwell hardness (R scale) HRa of the image receiving layer, more satisfactory color development characteristic can be obtained.

The external additive allowed to adhere to the surfaces of the toner particles generally exist in the form of secondary particles. Moreover, a portion of the external additive exists in concave portions in the surfaces of the toner particles. The results of this example are realized because a portion of the toner is forcibly introduced into the image receiving layer when transference is performed and thus the external additive existing in the concave portions of the toner can satisfactorily be decomposed and crushed. The results of this example causing a portion of the toner to be introduced into the image receiving layer when transference is performed enable the toner to easily be embedded in the image receiving layer when fixing is performed.

EXAMPLE 5-5

This example relates to fluidity of toner in the image forming apparatus according to the present invention.

The specific structure of this example is similar to that according to Example 5-1 except for the degree of coagulation of toner.

Results of this example are shown in Table 32.

[TABLE 32]

| Haze | | | | | | | |
|---|---|---|---|---|---|---|---|
| | Degree of Coagulation | | | | | | |
| HRa | 2 | 3 | 5 | 14 | 19 | 27 | 30 |
| 121 | X | Δ | O | O | O | Δ | X |
| 111 | Δ | O | O | O | O | O | Δ |
| 88 | Δ | O | O | O | O | O | Δ |
| 63 | Δ | O | ◎ | ◎ | ◎ | O | Δ |

The above-mentioned image receiving sheets are cut by a diamond cutter to observe their cross sections. As a result, the image receiving sheet each having an image formed by the toner having the degree of coagulation of 30 degrees had small air bubbles and interface observed between toner particles.

As can be understood from the above-mentioned results, satisfactory color development characteristic can be obtained by making the degree of coagulation of toner to be 3% or higher.

The reason for this is that the pressure applied by the transference means is consumed to cause the toner in the toner layer to flow and rearranged if the degree of coagulation is small, that is, if the fluidity is high. Therefore, the pressure does not contribute to decomposing and crushing the external additive existing in the interface between the toner and the image receiving layer.

As can be understood from the above-mentioned results, satisfactory color development characteristic can be obtained when the degree of coagulation of the toner is made to be 27% or lower.

If the degree of coagulation is large, that is, if the fluidity is low when the toner is pressed against the image receiving sheet when transference is performed, the pressure applied by the transfer means greatly contributes to decompose and crush the external additive existing in the interface between the toner and the image receiving layer. However, since the toner in the toner layer does not flow and rearranged, many gaps exist between toner particles and an interface or the like is unintentionally generated between toner particles when fixing is performed.

Therefore, toner must have fluidity to a degree which causes the toner to be rearranged in a direction in which the close-packed structure capable of minimizing gaps in the toner layer is formed when transference is performed.

EXAMPLE 5-6

This example relates to the-quantity of non-fixed toner (the quantity of toner on the image receiving sheet after the transference and before fixing) on the image receiving sheet of the image forming apparatus according to the present invention.

The specific structure of this example is similar to that according to Example 5-1 except for the quantity of non-fixed toner on the image receiving sheet when a solid image is formed and the density of the fixed image. Note that the density of the fixed image is adjusted by changing the quantity of the toner on the image receiving sheet or the coloring force of the toner, specifically, the quantity of the coloring matter to be added to the toner.

If the density of a solid image is lower than 1.0, visibility and the quality of the formed image generally deteriorate critically. Therefore, it is preferable that the density of the solid image is 1.0 or higher. Accordingly, solid images each having a density of 1.0 or higher are employed as the subjects in this example.

Results of this example are shown in Table 33.

[TABLE 33]

| | Haze | | |
|---|---|---|---|
| | Quantity of Non-Fixed Toner (g/cm$^2$) [Density of Image] | | |
| HRa | 0.4 [1.0] | 0.5 [1.0] | 0.6 [1.0] |
| 111 | ○ | ○ | Δ |
| 88 | ○ | ○ | ○ |
| 63 | ⊚ | ○ | ○ |

As can be understood from the above-mentioned results, satisfactory transparency can be obtained by making the quantity of toner on the image receiving sheet before fixing is performed to be 0.5 mg/cm$^2$ or smaller when the density of the fixed image on the image receiving sheet is 1.0 or higher.

EXAMPLE 5-7

This example relates to the shape factor of the toner in the image forming apparatus according to the present invention.

The specific structure of this example is similar to that according to Example 5-1 except for the shape factor SF-1 of the toner.

In this example, toner manufactured by polymerization (for example, refer to Japanese Patent publication No. Hei. 8 -297376) is employed. More specifically, toner has a so-called microcapsule structure in which wax serving as a releasing agent is capsuled in the binding resin.

In this embodiment, the color development characteristics of image receiving sheets respectively having images formed by toners having different shape factor SF-1 were evaluated.

Results of this example are shown in Table 34.

[TABLE 34]

| | Color Development Characteristic Shape Factor SF-1 | | | |
|---|---|---|---|---|
| HRa | 100 | 130 | 150 | 160 |
| 121 | ○ | ○ | ○ | Δ |
| 118 | ⊚ | ⊚ | ○ | Δ |
| 111 | ⊚ | ⊚ | ○ | ○ |
| 88 | ⊚ | ⊚ | ⊚ | ○ |
| 63 | ⊚ | ⊚ | ⊚ | ○ |

As can be understood from the above-mentioned results, further satisfactory color development characteristics can be obtained by making the shape factor SF-1 of the toner to be 150 or lower, more preferably 130 or lower.

The reason for this is that toner in the toner layer is made to flow and rearranged because the toner is pressed against the image receiving sheet when transference is performed so that gaps between toner particles are easily be removed as compared with the monthilic toner. Therefore, an interface or the like cannot easily be generated between toner particles when fixing is performed.

By employing toner having the microcapsule structure in which wax is capsuled by the binding resin, no wax exists between the toner and the image-receiving layer when the toner has been embedded in the image receiving layer. Therefore, generation of an interface between the toner and the image receiving layer experienced with the toner having a structure such that wax is dispersed in the binding resin and thus the wax exposes on the surfaces of the toner particles and attributable to the wax can be prevented.

EXAMPLE 5-8

This example relates to the shape factor of the toner in the image forming apparatus according to the present invention.

The specific structure of this example is similar to that according to Example 5-4 except the shape factor SF-2 of the toner. More specifically, toner manufactured by the polymerization method (for example, refer to Japanese Patent Publication No. Hei. 8-297376) is employed.

In this embodiment, the color development characteristics of image receiving sheets having images formed by toners having different shape factor SF-2 were evaluated.

Results of this example are shown in Table 35.

[TABLE 35]

| | Color Development Characteristic Shape Factor SF-2 | | | | | |
|---|---|---|---|---|---|---|
| | (HRt: 63) | | | | (HRt: 95) | |
| HRa | 100 | 125 | 140 | 150 | 125 | 140 |
| 111 | ⊚ | ○ | ○ | ○ | ⊚ | ⊚ |
| 88 | ⊚ | ⊚ | ○ | ○ | ⊚ | ⊚ |
| 63 | ⊚ | ⊚ | ⊚ | ○ | ⊚ | ⊚ |

As can be understood from the above-mentioned results, further satisfactory color development characteristics can be obtained by making the shape factor SF-2 of the toner to be 140 or less, more preferably 125 or less.

The reason for this is that the external additive allowed to adhere to the surfaces of the toner particles and generally existing in the form of secondary particles mainly placed in the concave portions of the toner particles can sufficiently be decomposed and crushed by the structure of this example in which the concave portions of the toner are decreased. By decreasing the concave portions of the toner, a portion o the toner can easily be introduced into the image receiving layer when transference is performed as compared with the mont-hilic toner. Therefore, the toner can easily be embedded in the image receiving layer when fixing is performed.

EXAMPLE 5-9

This example relates to the angle of contact of the intermediate transfer belt of the image forming apparatus according to the present invention with respect to water.

The specific structure of this example is similar to that according to Example 5-5 except for the material of the intermediate transfer belt and the angle of contact of the same with respect to water. The intermediate transfer belts X, Y and Z respectively are a belt having a structure in which conductive carbon black is dispersed in carbon black, a belt having a conductive layer made of urethane resin and having a structure in which conductive carbon black and fluororesin particles are disposed in the conductive surface layer of a PET film having one side on which aluminum has been evaporated, and a belt having a structure in which conductive carbon black is dispersed in fluororesin.

Results of this example are shown in Table 36.

[TABLE 36]

| HRa | Haze: Degree of Coagulation of Toner | 27 | | | 30 | | |
|---|---|---|---|---|---|---|---|
| | Intermediate Transfer Belt | X | Y | Z | X | Y | Z |
| | Angle of Contact with Water | 78 | 80 | 94 | 78 | 80 | 94 |
| 121 | | O | O | O | X | Δ | O |
| 111 | | O | O | O | Δ | Δ | O |
| 88 | | O | O | ⊙ | Δ | O | O |

As can be understood from the above-mentioned results, an image having satisfactory transparency can be obtained by making the contact angle of the intermediate transfer belt with respect to water to be 80 degrees or larger even if toner having great degree of coagulation, that is, low fluidity, is used.

If a portion of the toner on the image receiving sheet is again allowed to adhere to the intermediate transfer belt at a position near the discharge port through which the image receiving sheet passes through the transference position, mutual actions, for example, the mechanical adhesive force or electrostatic force acting between the toner layer on the image receiving sheet and the toner which is allowed to adhere to the intermediate transfer belt cause the toner layer to be extended toward the intermediate transfer belt, thus causing gaps in the toner layer to be enlarged. By reducing the quantity of the toner which is allowed to adhere to the intermediate transfer belt, a state where gaps in the toner layer are reduced can be maintained at the transference position. Fixing of toner to the intermediate transfer belt, that is, so-called filming takes place such that toner left on the intermediate transfer belt is pressed by a cleaning means or the like when transference is performed and thus the toner is deformed. By reducing the toner left after the transference has been performed, filming of the toner on the intermediate transfer belt can be prevented. Thus, the durability of the intermediate transfer belt can be improved.

EXAMPLE 5-10

This example relates to the quantity of image dispersion caused by the non-fixed toner on the image receiving sheet of the image forming apparatus according to the present invention.

The specific structure of this example is similar to that according to Example 5-6 except for the quantity of image dispersion and the structure in which the image which is formed on the intermediate transfer belt is not a solid image. In this embodiment, a line image having a plurality of hair lines each having a width of 100 μm and formed in parallel to one another at intervals of 200 μm is evaluated.

Results of this example are shown in Table 37.

[TABLE 37]

| HRa | Haze: Quantity of Non-Fixed Toner When converted into Solid Image ($g/cm^2$) — Quantity of Image | 0.5 | | | 0.6 | | |
|---|---|---|---|---|---|---|---|
| | Dispersion (μm) | 10 | 15 | 25 | 10 | 15 | 25 |
| 111 | | Δ | O | O | Δ | Δ | O |
| 88 | | Δ | O | ⊙ | Δ | O | O |
| 63 | | Δ | O | ⊙ | Δ | O | ⊙ |

As can be understood from the above-mentioned results, further satisfactory transparency can be obtained by making the quantity of image dispersion of the image formed by the non-fixed toner on the image receiving sheet to be 15 μm or more.

The reason for this is that adequate dispersion of the image makes smooth the cross sectional shape of the line image. Thus, waviness corresponding to the period of the line image on the surface of the image receiving layer in which the toner has been embedded can be prevented when fixing is performed and thus scattering of light on the surface of the image receiving layer can be prevented. Since the maximum thickness of the toner layer can be reduced if the same quantity of toner is used, toner can easily be embedded in the image receiving layer.

EXAMPLE 5-11

This example relates to change in the shape of the toner in the image forming apparatus according to the present invention occurring due to fixing.

Specifically, this example has a structure such that the average molecular weight, distribution of the molecular weight and crosslinking ratio of the resin in the image receiving layer are adequately adjusted to control the loss modulus and storage elastic modulus of the resin in the image receiving layer when fixing is-performed, that is, when resin is melted. As described above, the loss modulus and storage elastic modulus of the resin in the image receiving layer are changed with respect to the loss modulus and storage elastic modulus of the toner when fixing is performed so that change in the shape of the toner occurring due to fixing to the image receiving layer is controlled.

The specific structure of this embodiment is similar to that according to Example 5-7 unless otherwise specified.

Similarly to Example 5-1, the wear resistance of the image is evaluated and results are shown in Table 38.

In the following table, ΔML (%) is the change ratio of the absolute maximum length MXLNG of the toner occurring due to fixing and is defined as:

$$\Delta ML = |MXLNG\text{ before fixing} - MXLNG\text{ after fixing}| / MXLNG\text{ before fixing} \times 100$$

[TABLE 38]

| Shape Factor SF-1 | Reduction Ratio of Density of Image (%) | | | | |
|---|---|---|---|---|---|
| ΔML | 12 | 28 | 55 | 76 | 118 |
| 130 | 3 | 5 | 8 | 12 | 15 |
| 150 | 4 | 6 | 10 | 14 | 15 |

As can be understood from the above-mentioned results, the reduction ratio of the density of the image, that is, the wear resistance of the image on the image receiving sheet can furthermore be improved by making the shape of the toner to be substantially the same even after fixing has been performed. Note that the state where the shape of the toner is the same even after the fixing means in the present invention is defined to be a state where ΔML is 55% or lower, more preferably ΔML is 28% or lower.

As described above, the shape of the toner is made to be substantially the same even after fixing has been performed so that toner is further easily embedded in the image receiving layer when fixing is performed. Therefore, the wear resistance of an image can be improved even in a highlight portion in the toner is not allowed to adhere in a large quantity. Moreover, the smoothness of the image and the surface of the image receiving layer can be improved so that the color development characteristic and transparency are improved. Another effect can be obtained in that generation of moire can be prevented.

Since the shape of the toner is substantially the same even after fixing has been performed, exposure of the releasing agent occurring due to deformation of toner of a type having a structure such that the releasing agent is encupsuled can be prevented. Therefore, another effect can be obtained in that generation of an interface between the toner and the image receiving layer attributable to the releasing agent can be prevented.

As described above, the image receiving sheet comprises an image receiving layer formed on a base sheet and made of resin and structured to form an image by embedding color toner in the image receiving layer, wherein distribution of molecular weight of the resin in the image receiving layer measured by gel permeation chromatography (GPC) of soluble matters of tetrahydrofuran (THF) has at least two peaks or shoulders. Therefore, both of the excellent surface smoothness and offset resistance can be realized by embedding toner in the image receiving layer.

Since distribution of molecular weight of the resin in the image receiving layer measured by GPC has at least one peak or shoulder in a region in which the molecular weight is less than 10,000 and a region in which the same is 10,000 or more, an image receiving sheet having further improved surface smoothness and offset resistance can be realized.

Since the resin in the image receiving layer contains insoluble matter of THF by 40 wt % or lower, embedding of toner into the image receiving layer is not inhibited. Thus, an image receiving sheet having excellent offset resistance can be obtained.

Since the resin in the image receiving layer has an acid value of 100 mgKOH/g or less, deterioration in the transferred image attributable to change in the environment can be prevented.

Since distribution of molecular weight of the resin in the image receiving layer measured by GPC has at least one peak or shoulder in region A in which the molecular weight is less than 10,000 and region B in which the same is 10,000 or more, and $0.2 \leqq Ha/Hb < 5$ is satisfied when the height of the maximum peak or shoulder in the region A is Haze and the maximum peak or shoulder in the region B is Hb, balance of the surface smoothness and offset resistance attributable embedding of toner can satisfactorily be set.

Since the resin in the image receiving layer has distribution of molecular weight in a direction of the thickness of the sheet and the vertical relationship of the distribution of the molecular weight is changed, the characteristic of the image receiving sheet, such as the surface smoothness and the offset resistance realized by embedding toner, can easily be controlled.

Further, as described above, the image receiving sheet comprising an image receiving layer which is formed on a base thereof and on which a toner image can be fixed, wherein the image receiving layer has a storage modulus (G') of $1 \times 10^2$ Pa to $1 \times 10^5$ Pa and a loss modulus (G") of $1 \times 10^2$ Pa to $1 \times 10^5$ Pa at temperatures at which the toner is fixed. Therefore, the image receiving sheet simultaneously has improved smoothness of the surface and offset resistance.

Since the image receiving layer has a loss tangent (G"/G') which is the ratio of the loss modulus (G") and the storage modulus (G') and which is 0.01 to 10 at temperatures at which the toner is fixed, an image receiving sheet having excellent surface smoothness and offset resistance can be provided.

Since the resin of the image receiving layer has a loss tangent (G"/G') which is the ratio of the loss modulus (G") and the storage modulus (G') and which has at least one peak value in a range from 50° C. to 150° C., an image receiving sheet having excellent surface smoothness and offset resistance can be provided.

Since the storage modulus (G') of the image receiving layer is lower than the storage modulus (G't) of the toner at temperatures at which the toner is fixed, a sharp image having excellent surface smoothness and offset resistance free from deformation of the image can be formed.

Since the loss modulus (G") of the image receiving layer is lower than the loss modulus (G"t) of the toner at temperatures at which the toner is fixed, a sharp image having excellent surface smoothness and offset resistance free from deformation of the image can be formed.

Since the loss tangent (G"/G') of the image receiving layer and that of the toner have at least one peak value and Ts<Tt is satisfied when the lowest temperatures at which the image receiving layer and the toner have the peak values are Ts and Tt, a sharp image free from deformation of the image can be formed.

Since the fixing means has a press contact portion having a heating member and a pressing member so as to fix the image by allowing the image receiving sheet having the toner image formed thereon to pass through the press contact portion and the following relationship is satisfied when the pressure of the press contact portion of the fixing means is P $kgf/cm^2$: $1\ kgf/cm^2 \leqq P \leqq 20\ kgf/cm^2$, an image receiving sheet having excellent surface smoothness and satisfactory fixing characteristic and winding resistance can be provided.

Since the following relationship is satisfied when the length of the press contact portion in the direction in which the image receiving sheet is conveyed is L mm: 0.5 mm $\leqq L \leqq 10$ mm, an image receiving sheet having excellent surface smoothness and satisfactory fixing characteristic and winding resistance can be provided.

Since the following relationship is satisfied when the length of the press contact portion in the direction in which the image receiving sheet is conveyed is L mm and the pressure of the press contact portion is P kgf/$cm^2$: 0.5 P $\leqq L \leqq 0.5$ P+4, a sharp image having excellent surface smoothness, fixing characteristic and satisfactory winding resistance free from deformation of the image can be formed.

Since the fixing means has a press contact portion so as to fix the image by allowing the image receiving sheet having the toner image formed thereon to pass through the press contact portion, and an average interval (Sm) of crests of the member of the press contact portion which are brought into contact with the image receiving layer is 20 $\mu$m or longer, an image receiving sheet having excellent surface smoothness can be provided.

Since the following relationship is satisfied when the average roughness (Ra) on the center line which is the roughness of the surface of the member of the press contact portion which is brought into contact with the image receiving layer is r $\mu$m and the average interval (Sm) of crests of the member and the average particle size of the toner is d $\mu$m: sr$\leqq$2d, an image receiving sheet having excellent surface smoothness can be provided.

Since the image forming apparatus has a structure in which the fixing means has a press contact portion so as to fix the image by allowing the image receiving sheet having the toner image formed thereon to pass through the press contact portion and the fixing means has enlarged number of the press contact portions, heat for use in the fixing process is effectively used to form an image having excellent surface smoothness can be formed.

Since a press contact portion (N1) of the plural press contact portions of the fixing means which has the largest pressure is disposed downstream of a press contact portion (N2) having second pressure in the direction in which the image receiving sheet is conveyed, heat for use in the fixing process is effectively used to embed the toner in the image receiving layer so that an image having excellent surface smoothness is formed.

Since the plural press contact portions of the fixing means are formed by pressing the plural pressing members to a heating member, and the following relationship is satisfied when the distance for which the image receiving sheet is moved between the most upstream press contact portion (Ns) and the most downstream press contact portion (Ne) in the direction in which the image receiving sheet is conveyed is Kse and the distance for which the image receiving sheet is moved between the most upstream press contact portion (Ns) and the press contact portion (N1) having the highest pressure is Ks1; Kse/2$\leqq$Ks2, heat for use in the fixing process is furthermore effectively used to embed the toner in the image receiving layer so that an image having excellent surface smoothness is formed.

Since the heating or pressing member forming the most downstream press contact portion of the plural press contact portions of the fixing means in the direction in which the image receiving sheet is conveyed and arranged to be brought into contact with the image receiving layer has JISA hardness (Mf) has the following relationship with respect to the JISA hardness (Mb) of the other member: Mf$\leqq$Mb, an image having excellent surface smoothness can be formed and excellent winding resistance can be realized.

Since the toner is embedded in said image receiving layer so that an image is formed, an image receiving sheet having excellent surface smoothness after fixing has been performed can be provided.

As described above, the image forming apparatus and image receiving sheet according to the present invention is able to form an image exhibiting excellent color development characteristic and transparency.

What is claimed is:

1. An image receiving sheet comprising:

a base sheet; and an image receiving layer formed on said base sheet and made of a resin having transparent resin as its main component, an image being formed by embedding color toner in said image receiving layer;

wherein distribution of molecular weight of said resin of said image receiving layer measured by gel permeation chromatography (GPC) of soluble matters of tetrahydrofuran (THF) has at least two peaks or two shoulders, or at least one peak and one shoulder;

wherein said image receiving layer has a thickness of at least 10 $\mu$m;

wherein said resin of said image receiving layer contains matter which is insoluble in THF by 40 wt % or lower.

2. The image receiving sheet according to claim 1, wherein the distribution of molecular weight of said resin of said image receiving layer measured by GPC has at least one peak or one shoulder in a region in which the molecular weight is less than 10,000 and a region in which the same is 10,000 or more.

3. The image receiving sheet according to claim 1, wherein said resin of said image receiving layer has an acid value of 100 mgKOH/g or less.

4. The image receiving sheet according to claim 1, wherein distribution of molecular weight of said resin of said image receiving layer measured by GPC has at least one peak or one shoulder in region A in which the molecular weight is less than 10,000 and region B in which the same is 10,000 or more, and 0.2$\leqq$Ha/Hb<5 is satisfied when the height of the maximum peak or shoulder in said region A is Ha and the maximum peak or shoulder in said region B is Hb.

5. The image receiving sheet according to claim 1, wherein said resin of said image receiving layer has distribution of molecular weight in a direction of a thickness of said sheet.

6. An image receiving sheet comprising:

a base; and an image receiving layer which is formed on said base and on which a toner image can be fixed;

wherein said image receiving layer has a storage modulus (G') of $1\times10^2$ Pa to $1\times10^5$ Pa and a loss modulus (G") of $1\times10^2$ Pa to $1\times10^5$ Pa at temperatures at which said toner is fixed;

wherein said image receiving layer has a thickness of at least 10 $\mu$m.

7. The image receiving sheet according to claim 6, wherein said image receiving layer has a loss tangent (G"/G') which is a ratio of the loss modulus (G") and the storage modulus (G') and which is 0.01 to 10 at temperatures at which said toner is fixed.

8. The image receiving sheet according to claim 6, wherein said image receiving layer has a loss tangent (G"/G') which is the ratio of the loss modulus (G") and the storage modulus (G') and which has at least one peak value in a range from 50° C. to 150° C.

9. An image receiving sheet comprising:

a base; and an image receiving layer being formed on said base and to which an image can be fixed;

wherein said image receiving layer consists essentially of an aromatic ester compound;

wherein said image receivable layer is transparent.

10. The image receiving sheet according to claim 9, wherein said image receiving layer consist essentially of of resin and said aromatic ester compound.

11. The image receiving sheet according to claim 9, wherein said image receiving layer contains said aromatic ester compound by 10 wt % or more with respect to an overall resin component forming said image receiving layer.

12. The image receiving sheet according to claim 9, wherein said image receiving layer consist essentially of of resin and said aromatic ester compound and the weight average molecular weight of said aromatic ester compound is smaller than the weight average molecular weight of said resin.

13. The image receiving sheet according to claim 9, wherein said image receiving layer has a phenylcarboxylate compound as said aromatic ester compound.

14. The image receiving sheet according to claim 9, wherein said image receiving layer contains dihydric phenylcarboxylate compound as said aromatic ester compound.

15. The image receiving sheet according to claim 9, wherein said image receiving layer contains dihydric alkyl phenylcarboxylate as said aromatic ester compound.

16. The image receiving sheet according to claim 9, wherein said image receiving layer contains alkyl phthalate as said aromatic ester compound.

17. The image receiving sheet according to claim 9, wherein said image receiving layer contains an alkyl phthalate compound having a long-chain alkyl ester portion having five or more carbon atoms as said aromatic ester compound.

18. The image receiving sheet according to claim 17, wherein said image receiving layer contains an alkyl phthalate compound having a long-chain alkyl ester portion having 20 or less carbon atoms as said aromatic ester compound.

19. The image receiving sheet according to claim 9, wherein said image receiving layer contains alkyl phthalate by 40 wt % or less with respect to an overall resin component forming said image receiving layer.

20. The image receiving sheet according to claim 9, wherein said image receiving layer contains said aromatic ester compound having an ester value of 200 mg KOH/g or higher.

21. An image receiving sheet comprising:

a base; and an image receiving layer being formed on said base and to which a toner image can be transferred;

wherein the Rockwell hardness (an R scale) Ha of said image receiving layer is 121 or less;

wherein said image receiving layer has a thickness of at least 10 $\mu$m.

22. The image receiving sheet according to claim 21, wherein the Rockwell hardness (an R scale) HRa of said image receiving layer is 111 or less.

23. The image receiving sheet according to claim 21, wherein the Rockwell hardness (an R scale) HRa of said image receiving layer is 63 or more.

24. The image receiving sheet according to claim 21, wherein said image receiving layer is made of thermoplastic resin.

* * * * *